US012632004B2

(12) United States Patent
Toyota et al.

(10) Patent No.: US 12,632,004 B2
(45) Date of Patent: May 19, 2026

(54) IMAGE FORMING APPARATUS HAVING MAIN ASSEMBLY AND INCLUDING DETECTION OF REMAINING TONER IN MOUNTABLE CARTRIDGE

(71) Applicant: CANON KABUSHIKI KAISHA, Tokyo (JP)

(72) Inventors: Akitoshi Toyota, Kanagawa (JP); Akira Yoshimura, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/758,141

(22) Filed: Jun. 28, 2024

(65) Prior Publication Data

US 2025/0004419 A1 Jan. 2, 2025

(30) Foreign Application Priority Data

Jun. 29, 2023 (JP) ................................ 2023-107474

(51) Int. Cl.
*G03G 21/18* (2006.01)

(52) U.S. Cl.
CPC ................................ *G03G 21/1832* (2013.01)

(58) Field of Classification Search
CPC ........... G03G 15/0862; G03G 15/0886; G03G 21/1832
See application file for complete search history.

(56) References Cited

U.S. PATENT DOCUMENTS

2021/0389692 A1* 12/2021 Oguni .................... G03G 15/70

FOREIGN PATENT DOCUMENTS

| | | | |
|---|---|---|---|
| JP | 2004-117866 | A | 4/2004 |
| JP | 2010-107775 | A | 5/2010 |
| JP | 2014-002199 | A | 1/2014 |
| JP | 2019-191476 | A | 10/2019 |

* cited by examiner

*Primary Examiner* — Hoang X Ngo
(74) *Attorney, Agent, or Firm* — Venable LLP

(57) ABSTRACT

An apparatus main body of an image forming apparatus includes an opening member; an urging portion; a detecting unit including a light emitting portion, a light receiving portion, and a pressed portion; and a shielding member. When the detecting unit is positioned in a first position and the shielding member is positioned in a third position, as viewed in an optical axis direction of the light emitting portion, at least a part of the light emitting portion or at least a part of the light receiving portion is positioned inside an opening and is shielded by the shielding member. When the detecting unit is positioned in a second position and the shielding member is positioned in a fourth position, as viewed in the optical axis direction, the light emitting portion and the light receiving portion are positioned inside the opening and are not shielded by the shielding member.

13 Claims, 11 Drawing Sheets

(a)

(b)

IMAGE FORMING APPARATUS HAVING MAIN ASSEMBLY AND INCLUDING DETECTION OF REMAINING TONER IN MOUNTABLE CARTRIDGE

FIELD OF THE INVENTION AND RELATED ART

The present invention relates to an image forming apparatus for forming an image on a recording material and an image forming apparatus main body of the image forming apparatus.

In an image forming apparatus of an electrophotographic type, a constitution in which a process cartridge or a cartridge, such a developing cartridge, accommodating toner as a developer is detachably mountable to the apparatus main body is used. In Japanese Laid-Open Patent Application No. 2010-107775, a constitution in which a toner detecting means provided in the apparatus main body and provided with a light emitting portion and a light receiving portion optically detects a remaining toner amount inside the process cartridge mounted to the apparatus main body of the image forming apparatus is disclosed. In this constitution, the light emitting portion and the light receiving portion have not been shielded in a state before the process cartridge is mounted to the apparatus main body of the image forming apparatus.

SUMMARY OF THE INVENTION

According to an aspect of the present invention, there is provided an apparatus main body of an image forming apparatus comprising: an opening member provided with an opening; urging means; a detecting unit (i) which includes a light emitting portion configured to emit light, a light receiving portion configured to receive the light emitted by the light emitting portion, and a pressed portion and (ii) which is configured to output a detection signal depending on a light receiving amount of the light emitted by the light emitting portion, wherein the detecting unit is provided movably relative to the opening member between a first position and a second position and is positioned in the first position by an urging force of the urging means, and wherein the detecting unit is configured so as to be moved from the first position to the second position against the urging force of the urging means by being pressed at the pressed portion; and a shielding member provided movably relative to both the opening member and the detecting unit between a third position and a fourth position, wherein when the detecting unit is positioned in the first position and the shielding member is positioned in the third position, in a case where the detecting unit is viewed in an optical axis direction of the light emitting portion, at least a part of the light emitting portion or at least a part of the light receiving portion is positioned inside the opening and is shielded by the shielding member, and wherein when the detecting unit is positioned in the second position and the shielding member is positioned in the fourth position, in a case where the detecting unit is viewed in the optical axis direction, the light emitting portion and the light receiving portion are positioned inside the opening and are not shielded by the shielding member.

Further features of the present invention will become apparent from the following description of exemplary embodiments with reference to the attached drawings.

Figure 2:
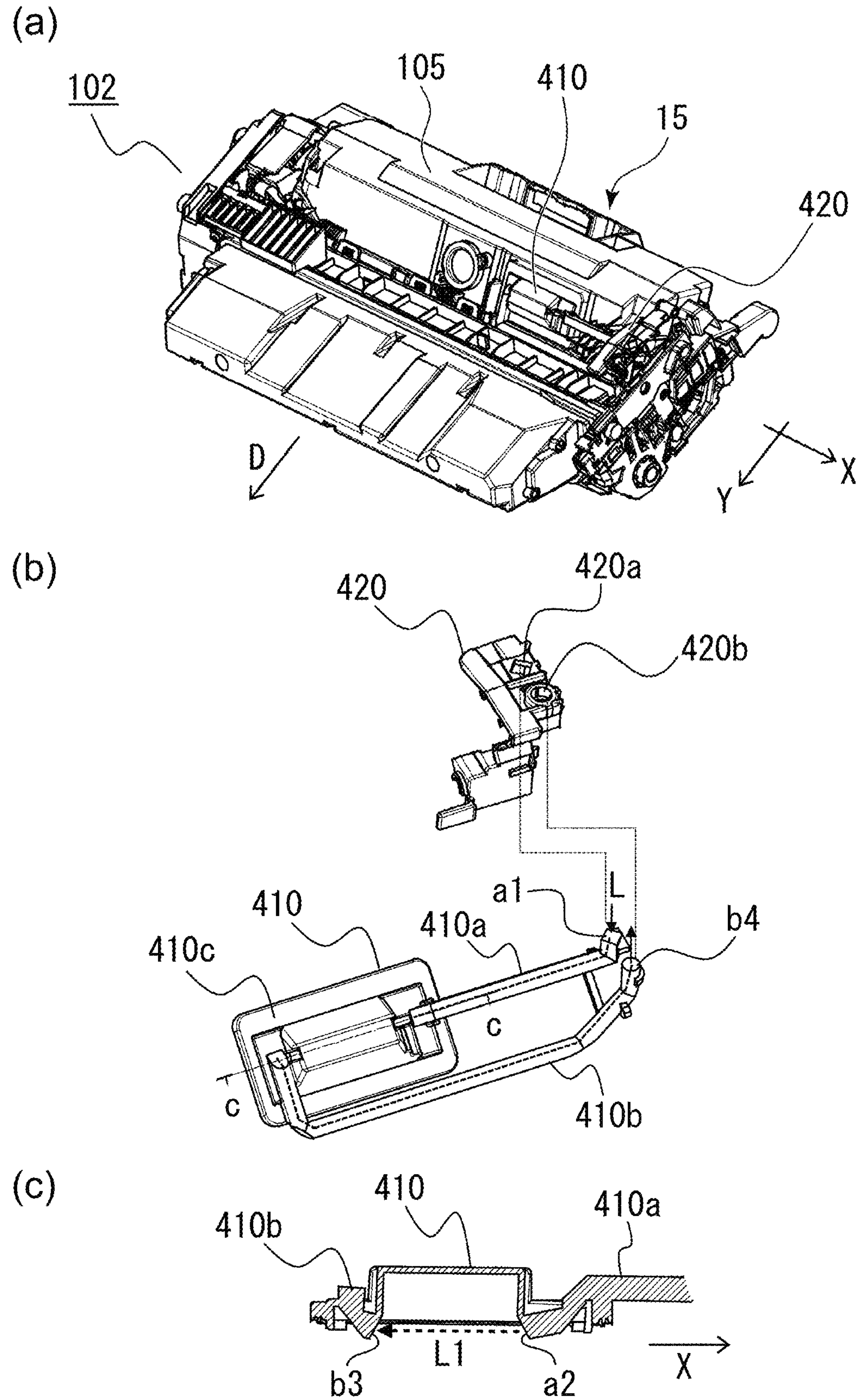

Part (a) of FIG. 2 is a perspective view of a process cartridge in the first embodiment, part (b) of FIG. 2 is an exploded view of a light guide and a light guide cover in the first embodiment, and part (c) of FIG. 2 is a sectional view of the light guide in the first embodiment.

Figure 3:
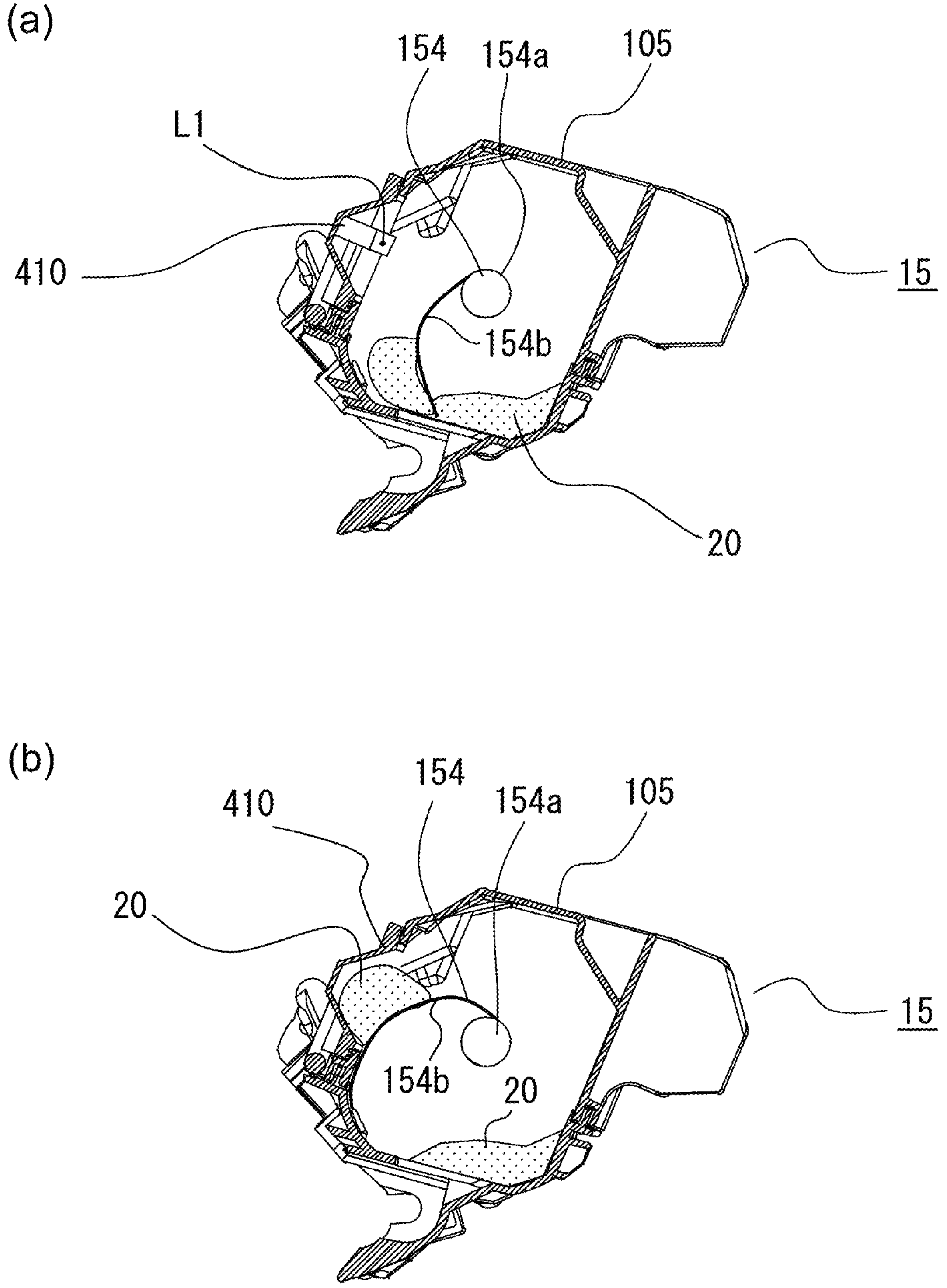

Parts (a) and (b) of FIG. 3 are sectional views for illustrating a principal of remaining toner amount detection in the first embodiment.

Figure 4:
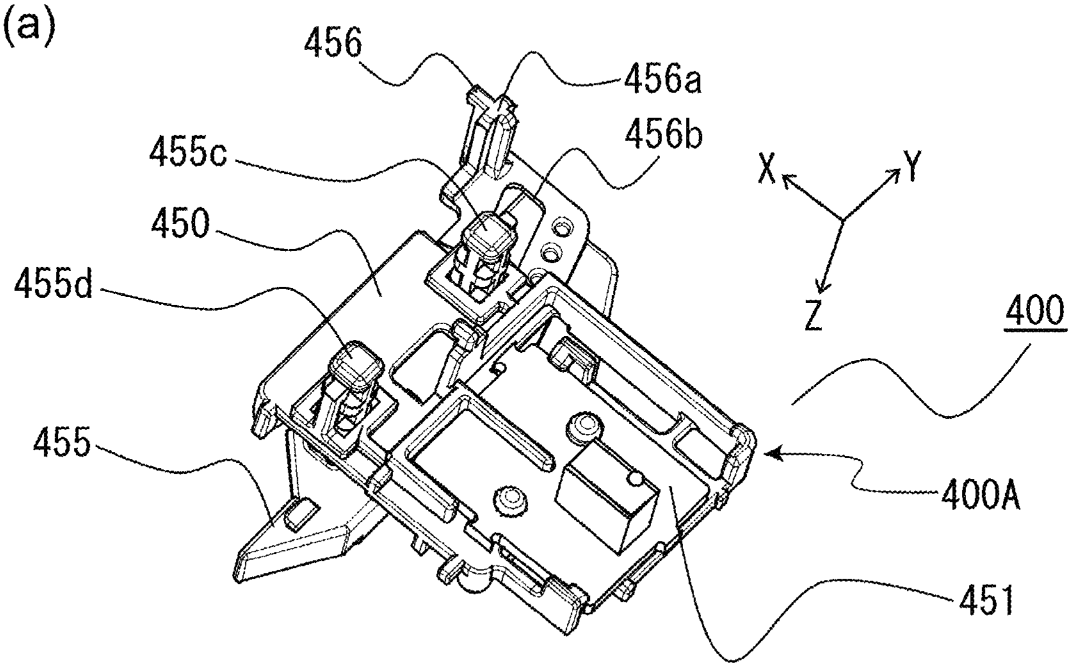
Figure 4:
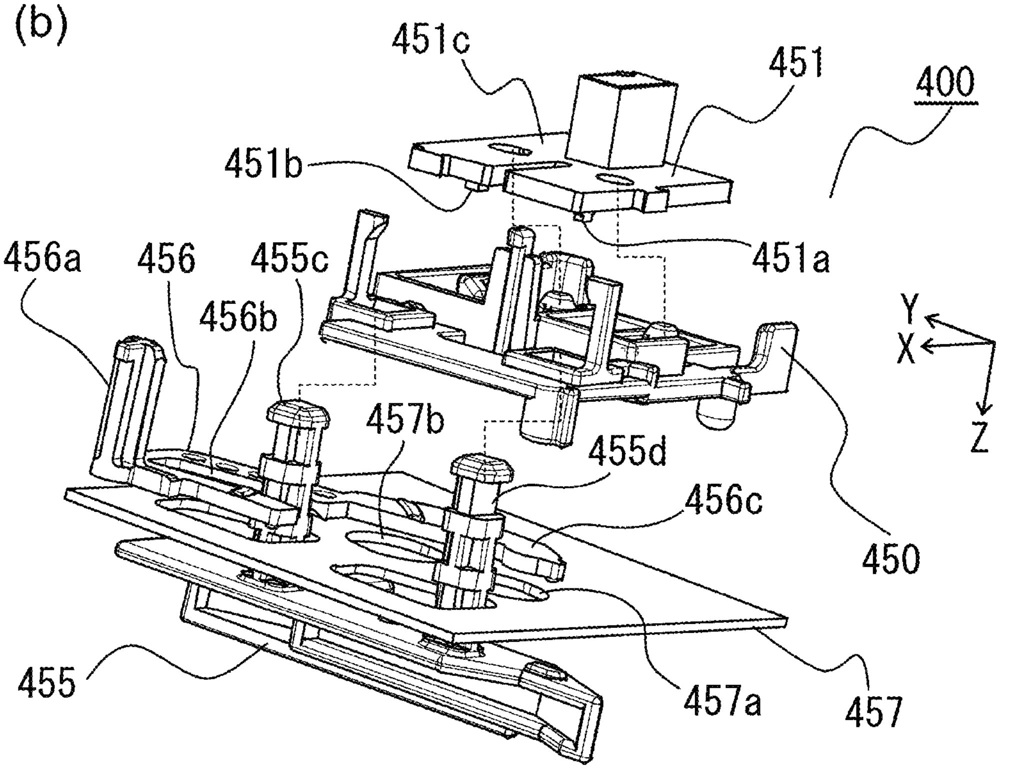

Parts (a) and (b) of FIG. 4 are a perspective view and an exploded view, respectively, of a detecting device in the first embodiment.

Figure 5:
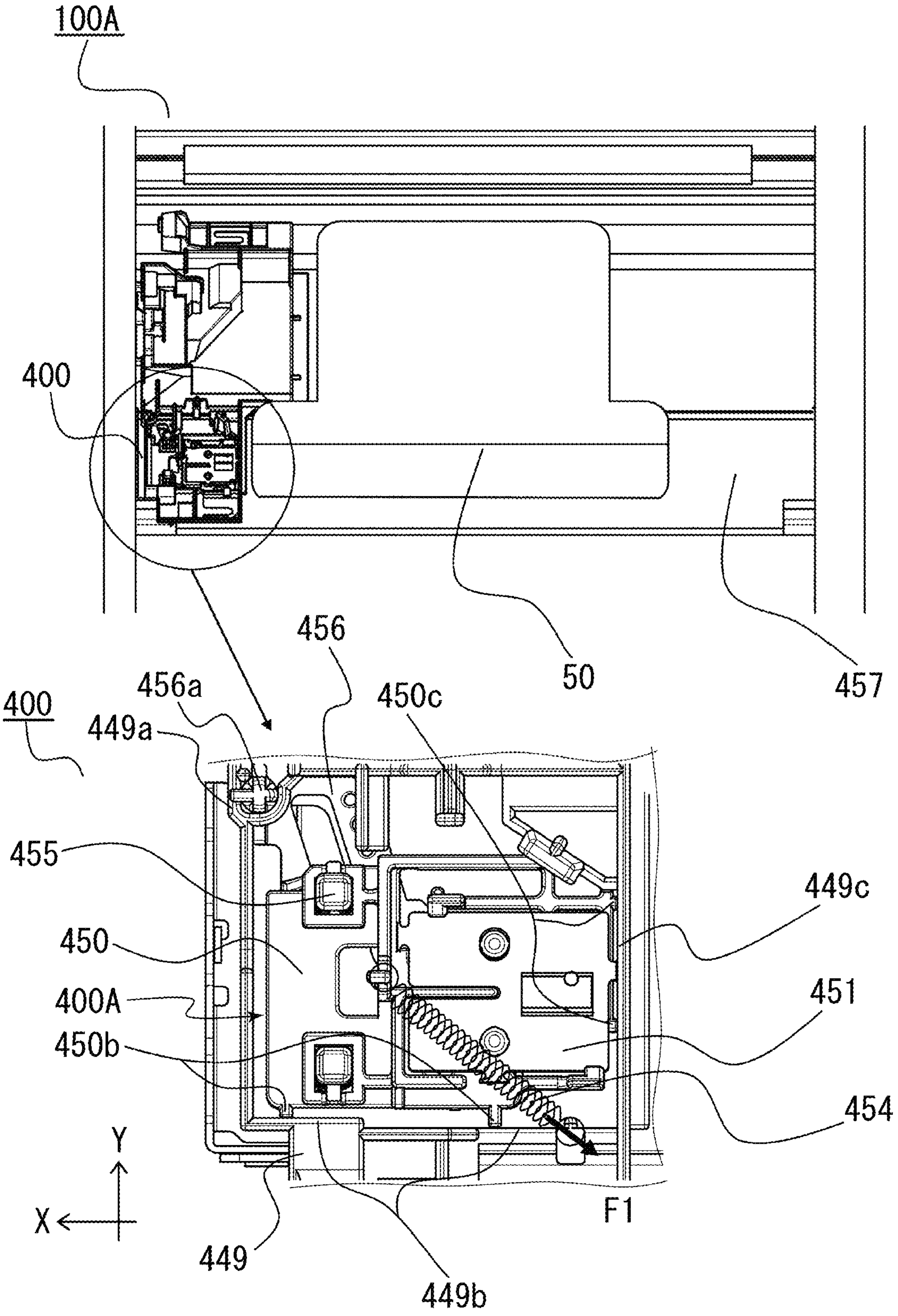

FIG. 5 is a schematic view in which an inside of an apparatus main body according to the first embodiment is viewed from above.

Figure 6:
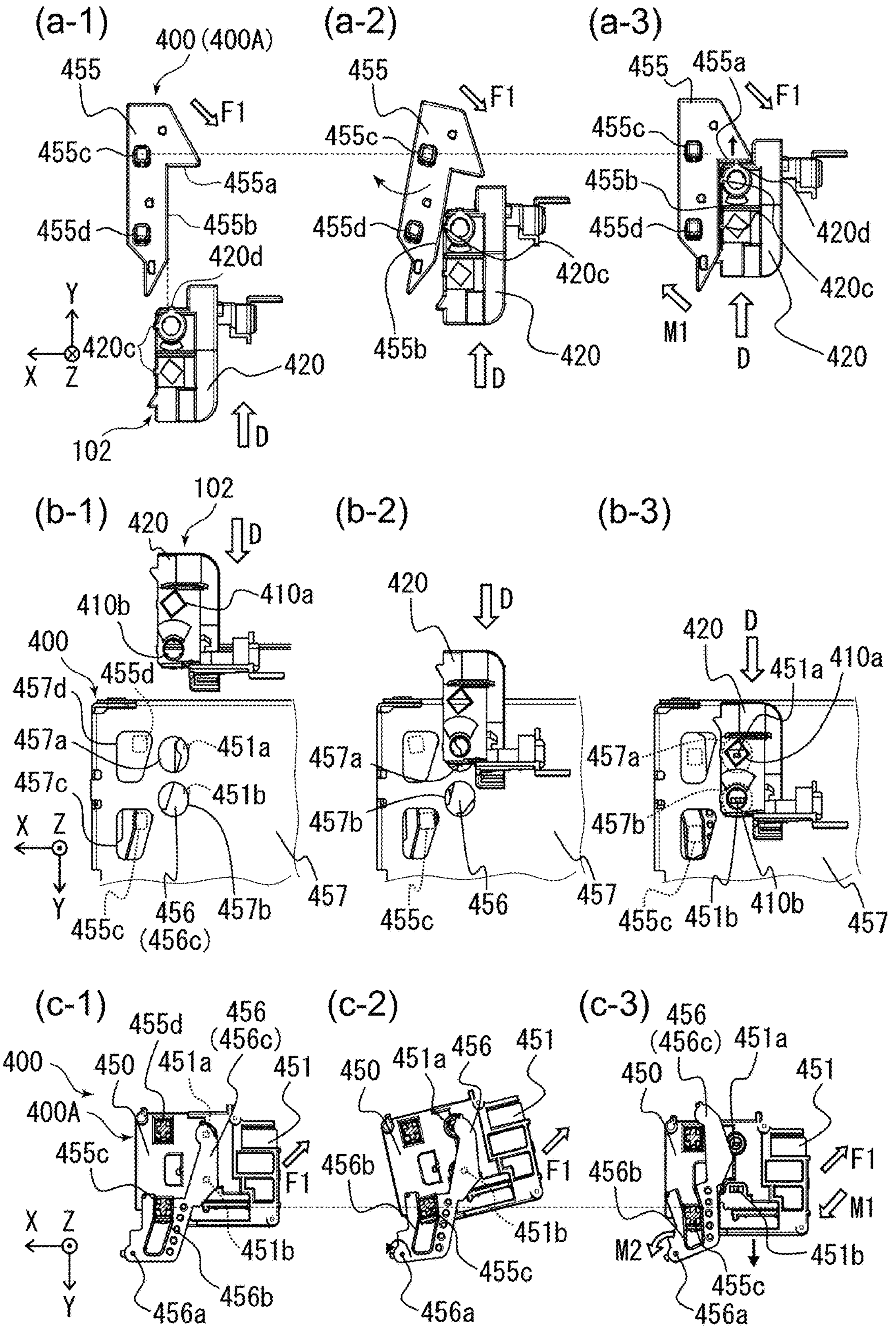

Parts (a-1) to (a-3), (b-1) to (b-3), and (c-1) to (c-3) of FIG. 6 are schematic views for illustrating an operation of the detecting device in the first embodiment.

Figure 7:
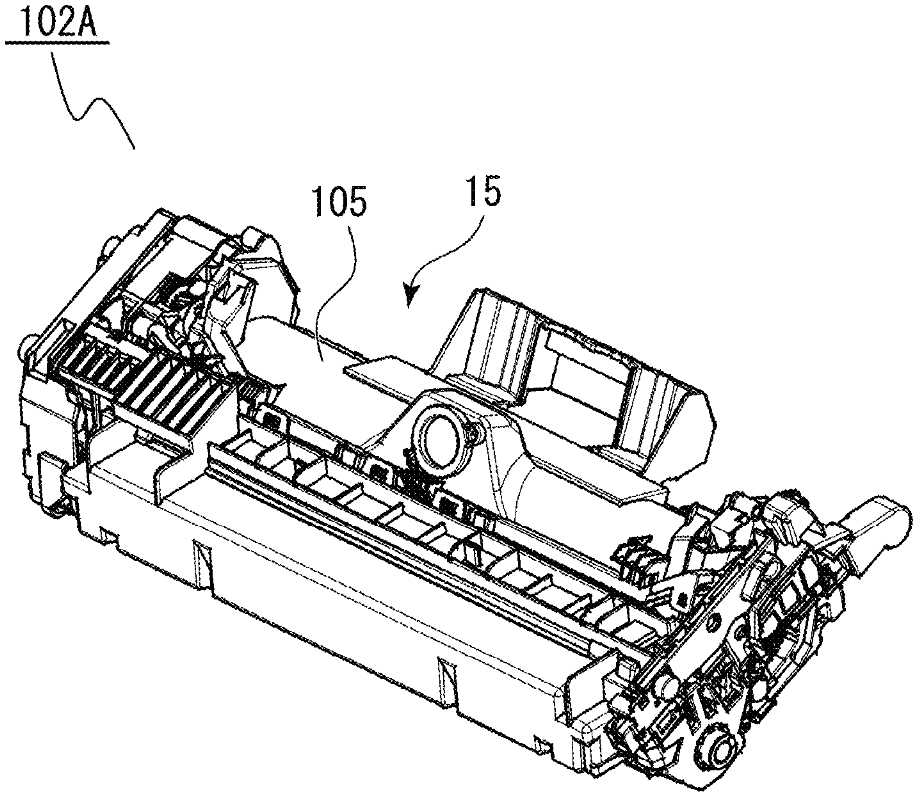

FIG. 7 is a perspective view of a process cartridge in a modified embodiment.

Figure 8:
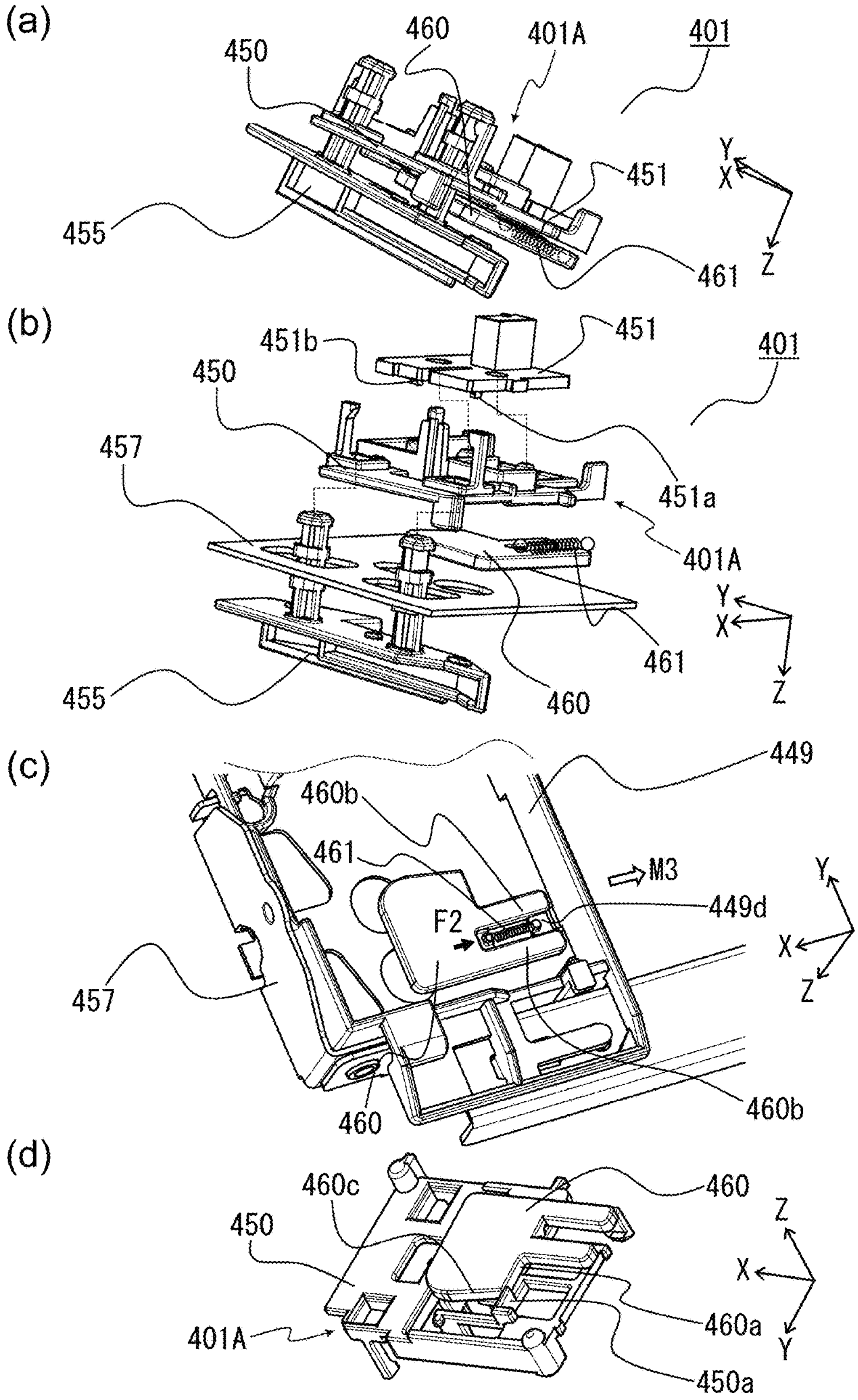

Parts (a) and (b) of FIG. 8 are a perspective view and an exploded view, respectively, of a detecting device in a second embodiment, and parts (c) and (d) of FIG. 8 are schematic view showing a shutter and a frame, and the shutter and a sensor substrate, respectively, in the second embodiment.

Figure 9:
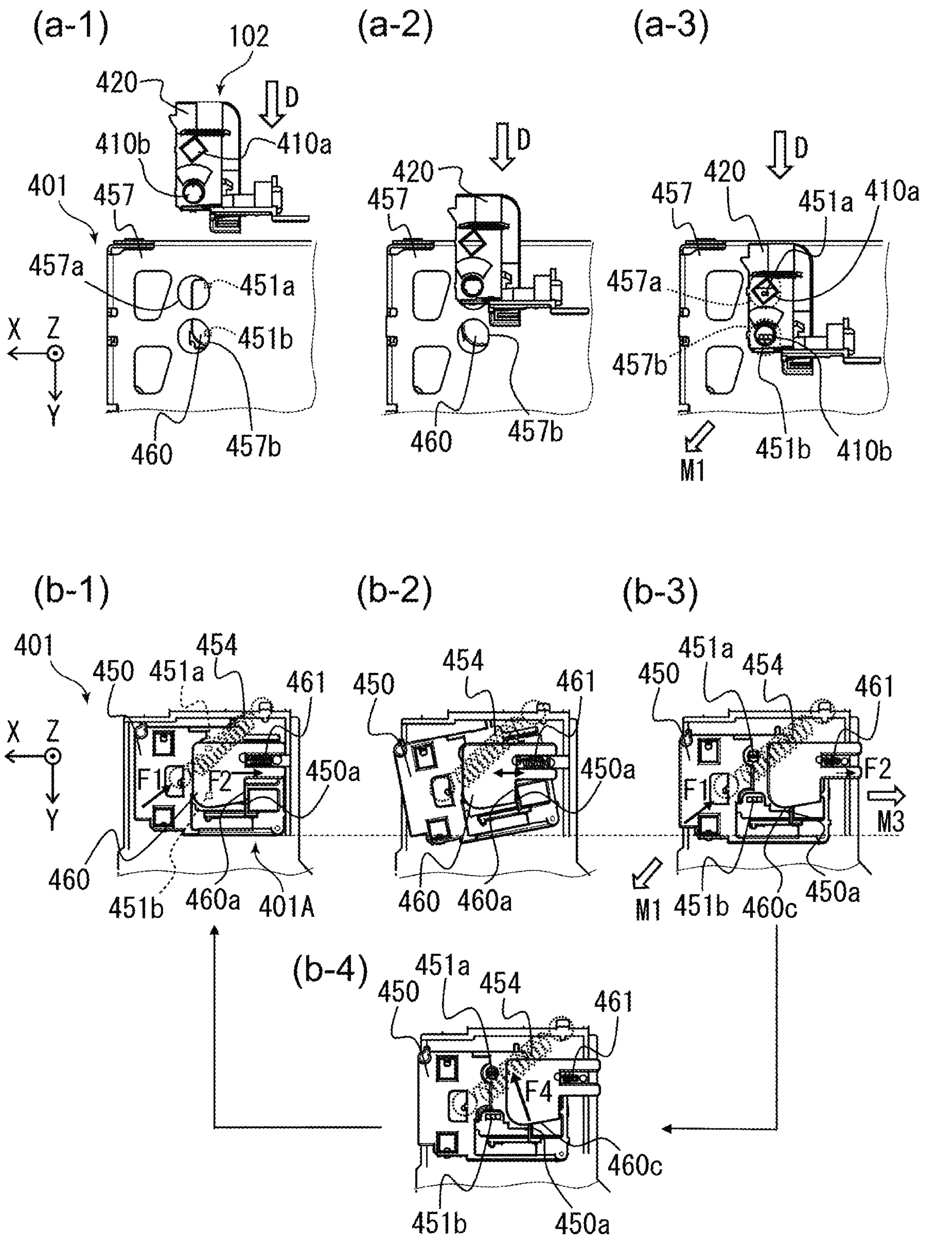

Parts (a-1) to (a-3) and (b-1) to (b-4) of FIG. 9 are schematic views for illustrating an operation of the detecting device in the second embodiment.

Figure 10:
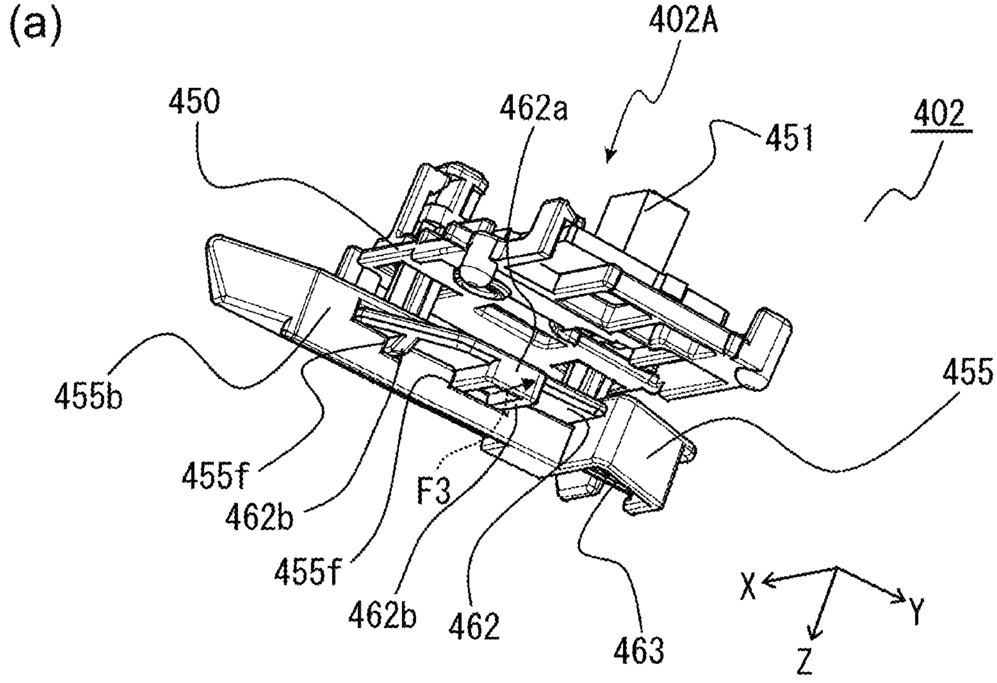
Figure 10:
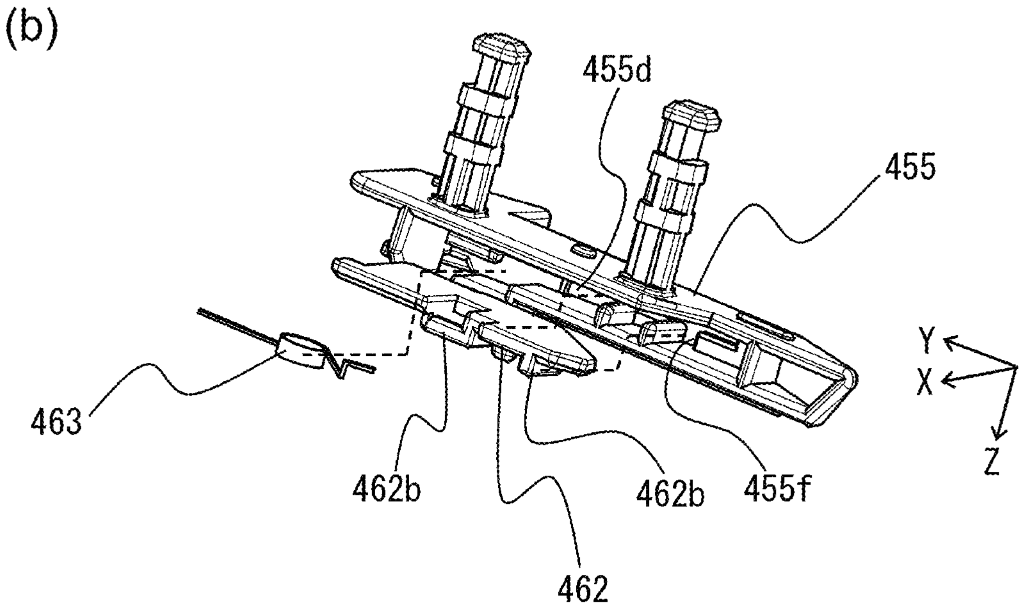

Part (a) of FIG. 10 is a perspective view of a detecting device in a third embodiment, and part (b) of FIG. 10 is an exploded view of a positioning guide, a shutter, and a shutter urging spring in the third embodiment.

Figure 11:
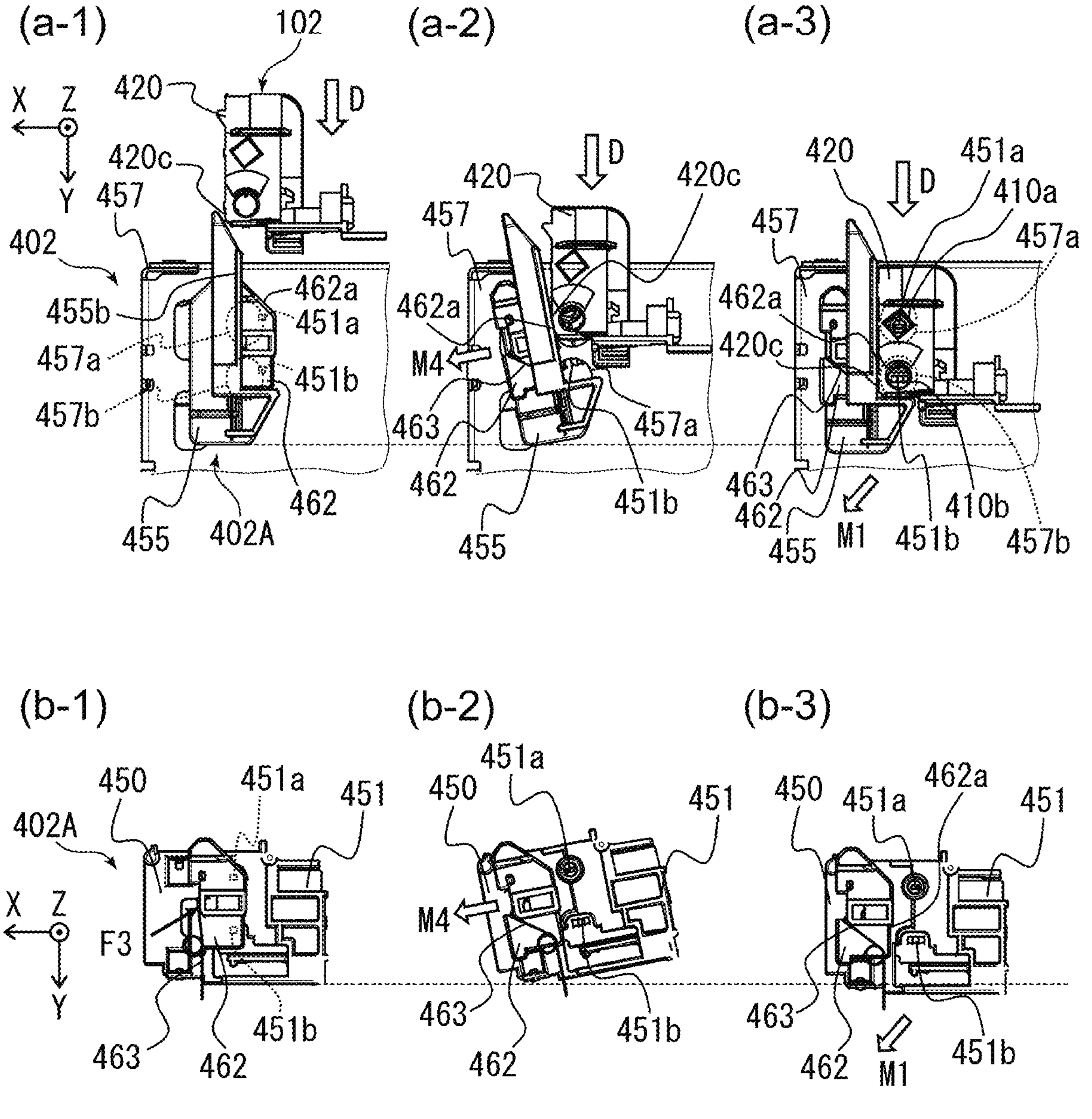

Parts (a-1) to (a-3) and (b-1) to (b-3) of FIG. 11 are schematic views for illustrating an operation of the detecting device in the third embodiment.

DESCRIPTION OF THE EMBODIMENTS

First Embodiment

An image forming apparatus according to a first embodiment will be described using FIGS. 1 to 7. In the following, a general structure of the image forming apparatus, a remaining toner amount detecting mechanism of a light transmission type, a detecting device of an apparatus main body, and an operation of a shutter in the detecting device will be described in a named order.

<Image Forming Apparatus>

Figure 1:
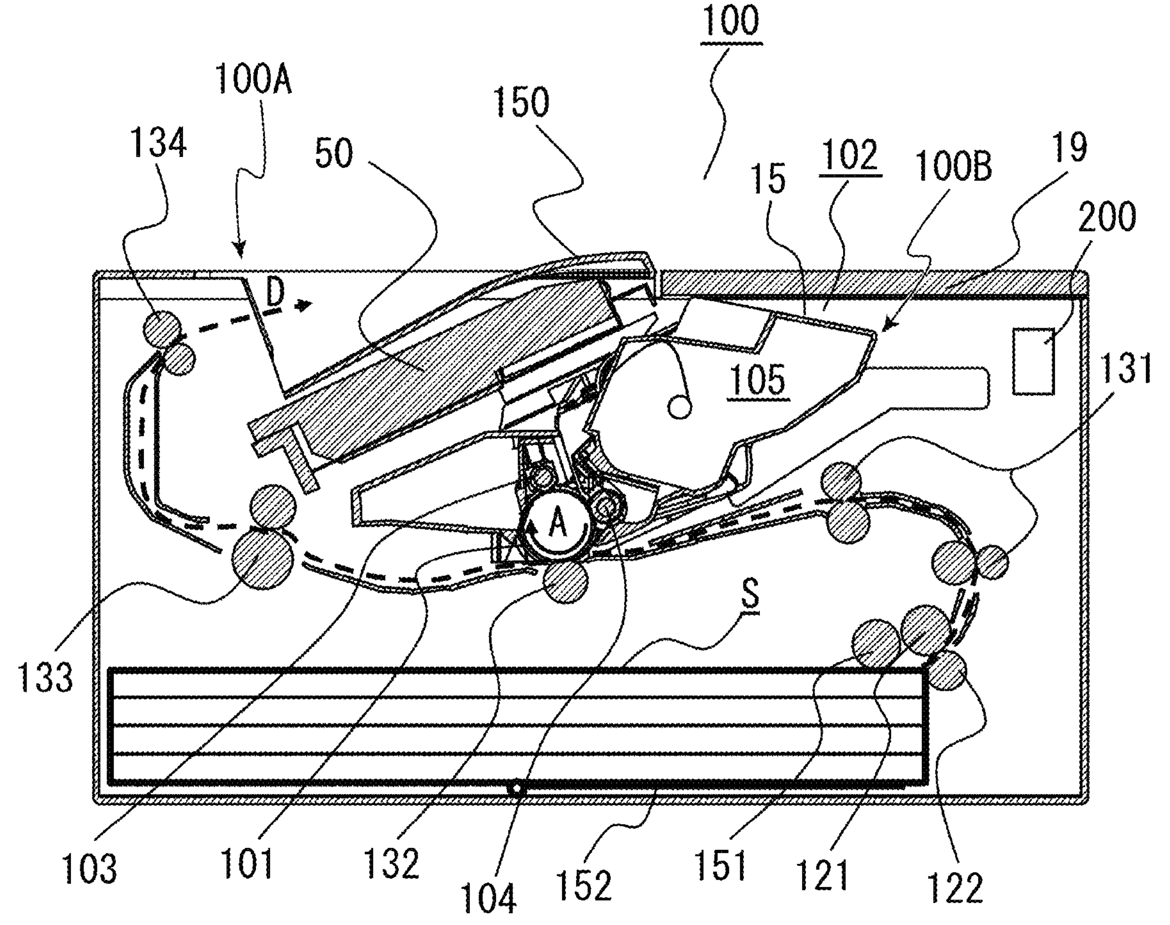
FIG. 1 is a schematic view of an image forming apparatus according to a first embodiment.

FIG. 1 is a sectional view showing a general structure of an image forming apparatus according to the first embodiment. The image forming apparatus 100 of this embodiment is a monochromatic printer for forming a monochromatic image on a sheet S which is a recording material by an electrophotographic process.

Incidentally, the "image forming apparatus" is not limited to the monochromatic printer, but may also be a color printer for forming a color image. Further, the "image forming apparatus" is not limited to a monofunctional printer for forming the image on the recording material on the basis of image information (print data) received from an outside, but may also be a copying machine provided with a copying function, a copying machine provided with a plurality of functions, and the like machine. As the sheet S which is the recording material (recording medium), it is possible to use various sheet materials different in size and materials, including paper such as plain paper and thick paper, surfacetreated sheet materials such as coated paper, special-shaped sheet materials such as an envelope and index paper, plastic films, cloths, and the like.

The image forming apparatus 100 includes an apparatus main body 100A which is an image forming apparatus main body and a process cartridge 102 as a process unit. The process cartridge 102 is capable of being mounted to and demounted (detached) from the apparatus main body 100A. The apparatus main body 100A refers to a portion excluding the process cartridge 102 from the image forming apparatus 100.

The apparatus main body 100A is provided with a mounting portion 100B (mounting space) in which the process cartridge 102 is mounted. The image forming apparatus 100 is capable of executing an image forming operation (described later) by mounting the process cartridge 102 in a predetermined mounting position of the mounting portion 100B. A user opens an openable cover 19 of the apparatus main body 100A and thus is capable of mounting and demounting the process cartridge 102. The openable cover 19 is movable to a closed position where the openable cover 19 covers the mounting portion 100B and the process cartridge 102 and an open position where the mounting portion 100B and the process cartridge 102 are exposed toward an outside of the apparatus main body 100A.

The process cartridge 102 includes a photosensitive drum 101 as an image bearing member, a charging roller 103 as a charging means, and a developing unit 15 as a developing means. The photosensitive drum 101 is provided with a substrate formed of, for example, aluminum in a cylindrical shape and a photosensitive layer formed of a photoconductor such as an organic photoconductor (OPC) at an outer peripheral portion of the substrate. The photosensitive drum 101 is rotatably supported by a frame of the process cartridge 102 at both opposite end portions with respect to a rotational axis direction. Further, the photosensitive drum 101 is constituted so as to be rotationally driven by inputting a driving force, from a driving source provided in the apparatus main body 100A, to a drive input portion provided at one end portion with respect to the rotational axis direction. The developing unit 15 includes a toner accommodating portion 105 (developing container) in which toner as a developer is accommodated, and a developing roller 104 as a developer carrying member for carrying and supplying the developer to the photosensitive drum 101.

In the following description, unless otherwise particularly specified, the rotational axis direction of the photosensitive drum 101 in a state in which the process cartridge 102 is mounted to the apparatus main body 100A is referred to as a longitudinal direction of the photosensitive drum 101 or simply referred to as the longitudinal direction. Further, also in the case where the process cartridge 102 which is not mounted to the apparatus main body 100A is described, the rotational axis direction is referred to as a longitudinal direction of the process cartridge 102 or simply referred to as the longitudinal direction.

The apparatus main body 100A includes a pick-up roller 151, a feeding roller 121, a separation roller 122, a conveying roller pair 131, an exposure unit 50 as an exposure means, a transfer roller 132, a fixing device 133, a discharging roller pair 134, and a controller 200. Further, at a lower portion of the apparatus main body 100A, a feeding tray 152 on which sheets S are stacked is provided.

The image forming apparatus 100 starts the image forming operation described in the following in the case where the image forming apparatus 100 receives an execution instruction together with image information (print data) from an external computer, for example.

When the image forming operation is started, a toner image is prepared in the process cartridge 102. Specifically, the photosensitive drum 101 is rotated in a rotational direction of an arrow A in FIG. 1. The charging roller 103 electrically charges a surface of the photosensitive drum 101 uniformly under application of a predetermined voltage. The exposure unit 50 performs exposure by irradiating the photosensitive drum 101 with light (for example, laser light on the basis of the image information, so that an electrostatic latent image is formed on the surface of the photosensitive drum 101. The developing roller 104 supplies the toner to the photosensitive drum 101, so that the electrostatic latent image is developed into a toner image.

In parallel to preparation of the toner image, the sheets S are fed and conveyed one by one from the feeding tray 152. The sheets S stacked on the feeding tray 152 are contacted to the pick-up roller 151 by raising of an intermediate plate (elevating plate) supporting a lower surface of the sheets S. By rotation of the pick-up roller 151, an uppermost sheet S is fed toward the feeding roller 121 and is further conveyed by the feeding roller 121. The separation roller 122 forming a separation nip in contact with the feeding roller 121 imparts a friction force to the sheet S in the separation nip, so that in the case where a plurality of sheets S enter the separation nip, conveyance of the sheet(s) S other than the uppermost sheet S is restricted.

The sheet S passed through the separation nip is conveyed to a transfer portion, where the photosensitive drum 101 and the transfer roller 132 oppose each other, by way of the conveying roller pair 131. In the transfer portion, by the transfer roller 132 to which a predetermined voltage is applied, the toner image on the photosensitive drum 101 is transferred onto the sheet S.

The sheet S on which the toner image is transferred is conveyed to the fixing device 133. The fixing device 133 heats the toner image on the sheet S by a heating means such as a halogen lamp or a ceramic heater while nipping and conveying the sheet S by a fixing roller pair. In a nip of the fixing roller pair, the toner image is melted and then is stuck under application of heat and pressure, whereby an image fixed on the sheet S is obtained. The sheet S passed through the fixing device 133 is discharged to the outside of the image forming apparatus 100 by the discharging roller pair 134 and is stacked on a discharge tray 150.

The controller 200 is an example of a control means for controlling an operation of the image forming apparatus 100. The controller 200 is provided with a CPU and a storing portion such as a ROM and a RAM. The CPU reads a program from the ROM and then executes the program, and thus controls the operation of the image forming apparatus 100. For example, the CPU notifies the user of information requiring exchange of the process cartridge 102, on the basis of a detection result of a remaining toner amount with use of a detecting device 400 (described later) or a detection result of the remaining toner amount by a method using no detecting device 400. A notifying method is not particularly limited, and includes, for example, display of an image at a display portion (liquid crystal panel or the like) provided on the apparatus main body 100A, and notification to an external computer connected to the image forming apparatus 100.

<Light Transmission-Type Remaining Toner Amount Detecting Mechanism>

A constitution of the process cartridge 102 relating to optical detection of the remaining toner amount (developer amount) will be described using parts (a) to (c) of FIG. 2. Part (a) of FIG. 2 is a perspective view of the process cartridge 102. Part (b) of FIG. 2 is an exploded view of a light guide 410 and a light guide cover 420 which are provided to the process cartridge 102. Part (c) of FIG. 2 is a sectional view of the light guide 410 taken along c-c line of part (b) of FIG. 2.

As shown in FIG. 2, the developing unit 15, which is a part of the process cartridge, 102 is provided with the light guide 410 and the light guide cover 420 covering a part of the light guide 410. The light guide 410 is attached to the toner accommodating portion 105 so as to cover an opening provided in a wall surface of the toner accommodating portion 105 of the developing unit 15. The light guide 410 is a light guiding member for guiding light emitted by a light emitting element 451*a* of the detecting device 400 (part (b) of FIG. 4) (described later) (hereinafter, this light is referred to as detection light).

Although details will be described later, as shown in parts (a) and (b) of FIG. 4, the image forming apparatus 100 is provided with the detecting device 400 including the light emitting element 451*a* and a light receiving element 451*b* as shown in parts (a) and (b) of FIG. 4. The image forming apparatus 100 of this embodiment includes a remaining toner amount detecting mechanism including the detecting device 400 of the apparatus main body 100A, and the light guide 410 and the light guide cover 420 of the process cartridge 102.

As shown in part (b) of FIG. 2, the light guide 410 includes a first light guiding portion 410*a* (input-side light guiding portion), a second light guiding portion 410*b* (output-side light guiding portion), and a window portion 410*c*. The first light guiding portion 410*a* guides detection light L, emitted by the light emitting element 451*a* (part (b) of FIG. 4) of the detecting device 400, to a spatial optical path L1 (part (c) of FIG. 2) passing through an inside space of the toner accommodating portion 105. The second light guiding portion 410*b* guides the detection light L, which enters from the spatial optical path L1 to the light receiving element 451*b* (part (b) of FIG. 4) of the detecting device 400. The window portion 410*c* is formed in a rectangular shape so as to cover the opening of the toner accommodating portion 105. The window portion 410*c* is fixed to the toner accommodating portion 105 at a peripheral edge portion of the opening of the toner accommodating portion 105 by a method such as welding or adhesive bonding.

As shown in parts (b) and (c) of FIG. 2, the first light guiding portion 410*a* includes a first surface a1 through which the detection light from the light emitting element 451*a* enters and a second surface a2 through which the detection light L is emitted to the spatial optical path L1 in the toner accommodating portion 105. The first surface a1 is positioned outside the toner accommodating portion 105, and the second surface a2 is positioned inside the toner accommodating portion 105. In a state in which the process cartridge 102 is mounted to the apparatus main body 100A, the first surface 1*a* opposes the light emitting element 451*a* through a detection opening 457*a* of the apparatus main body 100A (described later). In the remaining toner amount detecting mechanism of a light transmission type, the first surface a1 is an example of a light input portion through which the detection light L from the light emitting element 451*a* of the apparatus main body 100A is inputted to the process cartridge 102.

The second light guiding portion 410*b* includes a third surface b3 through which the detection light from the spatial optical path L1 enters and a fourth surface b4 through which the detection light L is emitted toward the light receiving element 451*b*. The third surface b3 is positioned outside the toner accommodating portion 105, and the fourth surface b4 is positioned inside the toner accommodating portion 105. Inside the toner accommodating portion 105, the third surface b3 of the second light guiding portion 410*b* opposes the second surface a2 of the first light guiding portion 410*a*. In a state in which the process cartridge 102 is mounted to the apparatus main body 100A, the fourth surface b4 opposes the light receiving element 451*b* through a detection opening 457*b* of the apparatus main body 100A. In the remaining toner amount detecting mechanism of a light transmission type, the fourth surface b4 is an example of a light output portion through which the detection light L is outputted from the process cartridge 102 toward the light receiving element 451*b* of the apparatus main body 100A.

In the state in which the process cartridge 102 is mounted to the apparatus main body 100A, the detection light L emitted from the light emitting element 451*a* of the detecting device 400 provided to the apparatus main body 100A enters the first surface a1 of the light guide 410 provided to the process cartridge 102. The detection light L travels the inside of the first light guiding portion 410*a* and is emitted into the toner accommodating portion 105 through the second surface a2, and then passes through the spatial optical path L1 and enters the third surface b3 of the second light guiding portion 410*b*. Then, the detection light L travels the inside of the second light guiding portion 410*b* and is emitted through the fourth surface b4, and then enters the light receiving element 451*b* of the apparatus main body 100A. The light receiving element 451*b* issues a detection signal depending on a light quantity of the detection light L which enters the light receiving element 451*b*.

Incidentally, a traveling path of the detection light L may be opposite to the above-described path. That is, a constitution in which the detection light L from the light emitting element 451*a* enters the fourth surface b4 of the second light guiding portion 410*b* and passes through the spatial optical path L1, and then is emitted toward the light receiving element 451*b* through the first surface a1 of the first light guiding portion 410*a* may be employed.

The first surface a1 of the first light guiding portion 410*a* and the fourth surface b4 of the second light guiding portion 410*b* are provided at an end portion on one end side of the process cartridge 102 with respect to the longitudinal direction (part (a) of FIG. 2). Further, the detecting device 400 is provided on one end side with respect to the longitudinal direction relative to the mounting portion 100B in which the process cartridge 102 is mounted (FIG. 5). That is, a position where the detection light L is inputted from the apparatus main body 100A to the process cartridge 102 and a position where the detection light L is outputted from the process cartridge 102 to the apparatus main body 100A are disposed on one end side of the process cartridge 102 with respect to the longitudinal direction. By this constitution, the detecting device 400 and parts (wirings or the like) attached to the detecting device 400 can be disposed collectively on one end side of the apparatus main body 100A with respect to the longitudinal direction.

In this embodiment, with respect to the longitudinal direction, the second surface a2 of the first light guiding portion 410*a* is disposed in a position closer to a center position of the process cartridge 102 than the first surface a1 is. Further, in this embodiment, with respect to the longitudinal direction, the third surface b3 of the second light guiding portion 410*b* is disposed in a position closer to the center position of the process cartridge 102 than the fourth surface b4 is. That is, the spatial optical path L1 in the toner accommodating portion 105 is disposed closer to a center of the process cartridge 102 than a position where input and output of the detection light are made between the apparatus main body 100A and the process cartridge 102 is. By this constitution, when the remaining toner amount is detected, the detection is not readily influenced by localization or the like of the toner in the toner accommodating portion 105 in the longitudinal direction.

The first light guiding portion 410*a* includes a portion extended along the longitudinal direction in at least a part between the first surface a1 and the second surface a2. The second light guiding portion 410*b* includes a portion extended along the longitudinal direction in at least a part between the third surface b3 and the fourth surface b4.

The light guide 410 may be an integrally molded article by a resin material through which the detection light transmits.

However, the light guide 410 is not limited to the integrally molded article, but for example, the first light guiding portion 410*a*, the second light guiding portion 410*b*, and the window portion 410*c* may also be separate components.

As shown in part (b) of FIG. 2, the light guide cover 420 includes a first positioning portion 420*a* for positioning the first light guiding portion 410*a* of the light guide 410 and a second positioning portion 420*b* for positioning the second light guiding portion 410*b* of the light guide 410. The light guide cover 420 is an example of a cover member engaging with the first light guiding portion 410*a* and the second light guiding portion 410*b* of the light guide 410. The first positioning portion 420*a* is a hole-shaped portion (rectangular hole) engaging with a columnar portion (a rectangular prism portion in part (b) of FIG. 2) including the first surface a1 of the first light guiding portion 410*a*. The second positioning portion 420*b* is a hole-shaped portion (circular hole) engaging with a columnar portion (a cylindrical portion in part (a) of FIG. 2) including the fourth surface b4 of the second light guiding portion 410*b*.

The light guide cover 420 is positioned to the frame of the process cartridge 102. Further, the first surface a1 and the fourth surface b4 of the light guide 410 are positioned to the frame of the process cartridge 102 by the light guide cover 420. The light guide cover 420 may be suitably formed of, for example, a material high in resin density and having flame retardancy.

A remaining toner amount detecting method will be described using parts (a) and (b) of FIG. 3. Parts (a) and (b) of FIG. 3 are sectional views in which the toner accommodating portion 105 of the developing unit 15 is cut along a flat plane which is perpendicular to the longitudinal direction and which passes through the light guide 410.

Inside the toner accommodating portion 105, a stirring member 154 for stirring toner 20 is provided. The stirring member 154 includes a shaft portion 154*a* extending in the longitudinal direction and a blade portion 154*b* projecting from the shaft portion 154*a* in a direction crossing the longitudinal direction. The stirring member 154 is rotated about the shaft portion 154*a* by a driving force inputted from a driving source provided in the apparatus main body 100A, and stirs the toner 20 in the toner accommodating portion 105 by the blade portion 154*b*.

When the toner 20 raised by the stirring member 154 reaches the spatial optical path L1 formed by the light guide 410, the detection light L is blocked by the toner 20. That is, the light receiving element 451*b* of the detecting device 400 issues a signal indicating that the light receiving element 451*b* does not receive the detection light L. Depending on an amount of the toner 20 in the toner accommodating portion 105, a length of a time in which the detection light L is blocked during one rotation of the stirring member 154 changes.

The controller 200 (FIG. 1) of the image forming apparatus 100 is capable of detecting the amount of the toner 20 in the toner accommodating portion 105 in a state in which the process cartridge 102 is mounted in the apparatus main body 100A and in which the stirring member 154 is driven. The controller 200 calculates the amount of the toner 20 in the toner accommodating portion 105 on the basis of, for example, a rotation cyclic period of the stirring member 154 and a length of a period in which the detection light L is blocked during the rotation cyclic period.

<Detecting Device>

Next, using parts (a) and (b) of FIG. 4 and FIG. 5, a constitution of the detecting device 400 in this embodiment will be described. Part (a) of FIG. 4 is a perspective view of the detecting device 400. Part (b) of FIG. 4 is an exploded view of the detecting device 400. FIG. 5 is a schematic view showing a mounting position of the detecting device 400 and showing a state of an inside of the apparatus main body 100A as viewed from above.

In the following description and in the respective drawings, a first direction with respect to the detecting device 400 is referred to as an “X direction”, and a second direction perpendicular to the X direction is referred to as a “Y direction”. A direction perpendicular to both the X direction and the Y direction is referred to as a Z direction. Further, in the following description and in the respective drawings, a “−X direction”, a “−Y direction”, and a “Z direction” represent opposite directions to arrow directions illustrated as the X direction, the Y direction, and the Z direction, respectively.

In this embodiment, the X direction is a direction substantially parallel to the longitudinal direction of the photosensitive drum 101. In this embodiment, the Y direction is a direction along a mounting direction D (part (a) of FIG. 2) of the process cartridge 102 to the apparatus main body 100A. Further, in this embodiment, the Y direction is a direction substantially parallel to a movement direction of the process cartridge 102 when the process cartridge 102 is mounted to the apparatus main body 100A.

As shown in parts (a) and (b) of FIG. 4, the detecting device 400 includes a sensor substrate 451, a substrate holder 450, a positioning guide 455, a shutter 456, and an urging spring 454 (FIG. 5). The sensor substrate 451 is provided with a substrate 451*c*, and the light emitting element 451*a* and the light receiving element 451*b* which are disposed on the substrate 451*c*. The detecting device 400 is supported by a frame 457 which is a part of the frame of the apparatus main body 100A.

Of the detecting device 400, the sensor substrate 451, the substrate holder 450, and the positioning guide 455 are constituted so as to be integrally moved relative to the frame 457. In the following, the sensor substrate 451, the substrate holder 450, and the positioning guide 455 are collectively referred to as a “sensor unit 400A”. The sensor unit 400A is an example of a detecting unit.

The sensor unit 400A is movable to a non-detection position (first position, stand-by position) and a detection position (second position). The non-detection position (first position) is a position where detection of the remaining toner amount using the sensor unit 400A is not performed. The detection position (second position) is a position for detecting the remaining toner amount of the toner in the process cartridge 102. Further, the non-detection position (first position) is a position of the sensor unit 400A in a state in which the process cartridge 102 is not mounted to the apparatus main body 100A. The detection position (second position) is a position of the sensor unit 400A in a state in which the process cartridge 102 is mounted to the apparatus main body 100A.

An optical axis direction of the light emitting element 451*a* is a direction crossing (preferably perpendicular to) both the X direction and the Y direction. In this embodiment, the optical axis direction of the light emitting element 451*a* is substantially parallel to the Z direction. However, by a method such as oblique mounting of the light emitting element 451*a* having directivity to the substrate 451*c*, the optical axis direction of the light emitting element 451*a* may also be a direction obliquely crossing a direction normal to the substrate 451*c*.

The sensor substrate 451 includes the light emitting element 451*a* as a light emitting portion and the light receiving element 451*b* as a light receiving portion. An example of the light emitting element 451*a* is an LED, and an example of the light receiving element 451*b* is a phototransistor, but another element may be used. In the following description, the light emitting element 451*a* and the light receiving element 451*b* are collectively referred to as a detecting element in some cases.

Incidentally, as described above, the traveling direction of the detection light L in the remaining toner amount detecting mechanism may be opposite to the traveling direction in part (b) of FIG. 2, and in that case, positions of the light emitting element 451*a* and the light receiving element 451*b* may only be required to be replaced with each other. For that reason, a constitution of the detecting device 400 described in the following is useful also in a modified embodiment in which the positions of the light emitting element 451*a* and the light receiving element 451*b* are replaced with each other.

The substrate holder 450 is an example of a holding member for holding the sensor substrate 451. The sensor substrate 451 is fixed to the substrate holder 450 by a method such as snap-fitting, screw fastening, or adhesive, so that the sensor substrate 451 is moved integrally with the substrate holder 450.

The positioning guide 455 includes contact portions 455*a* and 455*b* (parts (a-1) to (a-3) of FIG. 6) as pressed portions and projection portions 455*c* and 455*d*. The positioning guide 455 is a guiding member for positioning the sensor unit 400A during mounting of the process cartridge 102. The sensor unit 400A is constituted so that the sensor unit 400A is moved from the non-detection position to the detection position by being pressed at the contact portions 455*a* and 455*b* during the mounting of the process cartridge 102 and is positioned (held) in the detection position.

The contact portions 455*a* and 455*b* in this embodiment are disposed so as to be pressed by the light guide cover 420 of the process cartridge 102. The contact portion 455*a* is a surface extending along the X direction. The contact portion 455*b* has a surface extending along the Y direction and is disposed in an L-shape with respect to the contact portion 455*a*. The contact portion 455*a* is an example of a first force receiving portion for receiving a pressing force in a first direction crossing the optical axis direction of the light emitting element 451*a*. The contact portion 455*b* is an example of a second force receiving portion for receiving a pressing force in a second direction crossing both the optical axis direction and the first direction. Here, examples of the first direction and the second direction are the Y direction and the X direction, respectively.

The projection portions 455*c* and 455*d* project in a direction crossing (preferably perpendicular to) both the X direction and the Y direction. Each of the projection portions 455*c* and 455*d* is engaged with the hole of the substrate holder 450. By this, the positioning guide 455 is connected so as to be moved integrally with the substrate holder 450 and the sensor substrate 451 held by the substrate holder 450. That is, the projection portions 455*c* and 455*d* function as a connecting portion for connecting the positioning guide 455 and the substrate holder 450. Incidentally, the connecting portion may be, for example, a member which is formed integrally with the substrate holder 450 and which is engaged with the positioning guide 455. Further, in this embodiment, one projection portion 455*c* also functions as an engaging portion engaging with the shutter 456, but the sensor unit 400A may also be provided with an engaging portion as a separate member from the projection portions 455*c* and 455*d*.

The shutter 456 is an example of a shielding member (openable member) movable relative to both the frame 457 and the sensor unit 400A. The shutter 456 is movable to a shielding position (third position) and an exposure position (fourth position, retracted position). The shielding position (third position) is a position of the shutter 456 in a state in which the process cartridge 102 is not mounted to the apparatus main body 100A. The exposure position (fourth position) is a position of the shutter 456 in a state in which the process cartridge 102 is mounted to the apparatus main body 100A.

The shutter 456 includes a shielding portion 456*c*, a supporting shaft 456*a*, and a guiding portion 456*b*. The shutter 456 is provided movably relative to the frame 457 as an opening member provided with detection openings 457*a* and 457*b*. The detection opening 457*a* is a hole (first hole) corresponding to the light emitting element 451*a*. The detection opening 457*b* is a hole (second hole) corresponding to the light receiving element 451*b*. Incidentally, the detection openings 457*a* and 457*b* can be formed as a single opening (hole-shaped portion or slit) by being communicated with each other.

The shielding portion 456*c* is a portion shielding (covering) the detection elements (451*a*, 451*b*) of the sensor substrate 451. In this embodiment, as described later, in the state before the process cartridge 102 is mounted, the shielding portion 456*c* is constituted so as to shield the light emitting element 451*a* and the light receiving element 451*b*.

The supporting shaft 456*a* is rotatably supported by the frame of the apparatus main body 100A. The supporting shaft 456*a* in this embodiment is supported by a shaft-receiving portion 449*a* of a positioning member 449 (FIG. 5) (described later). A direction of a rotation shaft of the shutter 456 is a direction crossing (preferably perpendicular to) both the X direction and the Y direction. The shutter 456 in this embodiment is moved between the shielding position and the exposure position by being rotated about the supporting shaft 456*a* relative to the frame 457.

The guiding portion 456*b* is an example of a portion-to-be-engaged engaged with the projection portion 455*c* as an engaging portion provided to the sensor unit 400A. The guiding portion 456*b* in this embodiment is a groove-shaped portion with which the projection portion 455*c* is engaged. By engagement between the projection portion 455*c* and the guiding portion 456*b*, the shutter 456 is positioned depending on the position of the sensor unit 400A. Specifically, when the sensor unit 400A is positioned in the non-detection position, the shutter 456 is positioned in the shielding position.

When the sensor unit 400A is positioned in the detection position, the shutter 456 is positioned in the exposure position. Further, the shutter 456 is moved in interrelation with movement of the sensor unit 400A during the mounting of the process cartridge 102.

In the frame 457, the detection openings 457*a* and 457*b* and through holes 457*c* and 457*d* are formed. The detection opening 457*a* is an opening through which the detection light L from the light emitting element 451*a* toward the light guide 410 passes during detection of the remaining toner amount. The detection opening 457*b* is an opening through which the detection light L from the light guide 410 toward the light receiving element 451*b* passes during the detection of the remaining toner amount. The frame 457 is an example of the opening member provided with the detection openings 457*a* and 457*b*.

The through holes 457*c* and 457*d* are holes through which the projection portions 455*c* and 455*d* of the positioning guide 455 are inserted, respectively. The through holes 4457*c* and 457*d* are formed broad in cross-sectional area compared with the projection portions 455*c* and 455*d* so as to permit movement of the positioning guide 455 during the mounting of the process cartridge 102 (described later) (part (b-1) of FIG. 6).

In this embodiment, the positioning guide 455 and the substrate holder 450 are connected to each other by way of the projection portions 455*c* and 455*d* penetrating through the through holes 457*c* and 457*d*, respectively. By this, positioning of the sensor substrate 451 can be performed by the positioning guide 455 disposed on a side (lower-surface side in part (b) of FIG. 4) opposite from a side (upper-surface side) in part (b) of FIG. 4) where the sensor substrate 451 is disposed onto the frame 457.

Incidentally, in this embodiment, of the detecting device 400, the positioning guide 455 contacting the light guide cover 420 is disposed on an inner surface side of the frame 457. The inner surface side of the frame 457 is a side (second side, Z direction side in this embodiment) of the mounting portion 100B where the process cartridge 102 is mounted to the frame 457, and an outer surface side of the frame 457 is a side (first side, −Z direction side in this embodiment) opposite from the inner surface side. Of the detecting device 400, the sensor substrate 451 and the substrate holder 450 are disposed on the outer surface side of the frame 457. The shutter 456 is disposed on the outer surface side of the frame 457 in a space between the frame 457, and the sensor substrate 451 and the substrate holder 450. The shutter 456 is disposed on the outer surface side (first side) relative to the frame (opening member), so that it is possible to avoid, for example, that a hand of a user or the like unintentionally contacts the shutter 456 from a space on the inner surface side.

As shown in FIG. 5, the detecting device 400 is disposed adjacent to the exposure unit 50 in the X direction. Incidentally, the exposure unit 50 is disposed on an upper surface side (outer surface side) of the frame 457 extending in the longitudinal direction so as to connect left and right side plates of the apparatus main body 100A. Further, the detecting device 400 is urged by the urging spring 454 as an urging means. The urging spring 454 in this embodiment is a tension spring. One end of the urging spring 454 is mounted to the positioning member 449 fixed to the outer surface of the frame 457, and the other end of the urging spring 454 is mounted to the substrate holder 450.

An urging force F1 of the urging spring 454 acts in an oblique direction which is −X direction and −Y direction.

The positioning member 449 includes an abutment portion 449*c* to which an end portion 450*c* of the substrate holder 450 abuts in the −X direction, and an abutment portion 449*b* to which an end portion 450*b* of the substrate holder 450 abuts in the −Y direction.

In the state in which the process cartridge 102 is not mounted to the apparatus main body 100A, the substrate holder 450 is abutted to the abutment portions 449*b* and 449*c* by the urging force F1 in the −X direction and the −Y direction. The abutment portion 449*b* is an example of a first abutment portion to which the detecting unit is abutted toward a direction (−Y direction) opposite to the first direction. The abutment portion 449*c* is an example of a second abutment portion to which the detecting unit is abutted toward a direction (−X direction) opposite to the second direction. That is, when the first force receiving portion and the second force receiving portion of the detecting unit do not receive the pressing force, the detecting unit is positioned in the first position in a state in which the detecting unit is abutted to the first abutment portion and the second abutment portion by the urging force of the urging means.

<Operation During Mounting of Cartridge>

Next, using respective views of FIG. 6, an operation of the detecting device 400 during mounting of the process cartridge 102 to the apparatus main body 100A will be described.

Parts (a-1) to (a-3) of FIG. 6 are schematic views in which the positioning guide 455 of the detecting device 400 and the light guide cover 420 of the process cartridge 102 are viewed from −Z direction. Parts (b-1) to (b-3) of FIG. 6 are schematic views in which the detection openings 457*a* and 457*b* and the detecting elements (451*a*, 451*b*) of the detecting device 400 and the first and second light guiding portions 410*a* and 410*b* of the light guide 410 of the process cartridge 102 are viewed from Z direction. Part (c-1) to (c-3) of FIG. 6 are schematic views in which the shutter 456, the sensor substrate 451, and the substrate holder 450 of the detecting device 400 are viewed from Z direction. In the respective views of FIG. 6, of constituent elements of the remaining toner amount detecting means in this embodiment, elements other than the above-described elements are omitted from illustration.

Parts (a-1), (b-1), and (c-1) of FIG. 6 show a state of the detecting device 400 before the mounting of the cartridge, i.e., before the process cartridge 102 is mounted to the apparatus main body 100A. Incidentally, parts (a-1) and (b-1) of FIG. 6 also illustrate the light guide cover 420 and the light guide 410 before the light guide cover 420 contacts the positioning guide 455 on the way of the mounting of the process cartridge 102 to the apparatus main body 100A. Parts (a-2), (b-2), and (c-2) of FIG. 6 show a state on the way of the cartridge mounting, i.e., after the light guide cover 420 contacts the positioning guide 455 on the way of the mounting of the process cartridge 102 to the apparatus main body 100A. Parts (a-3), (b-3), and (c-3) of FIG. 6 show a state after the cartridge mounting, i.e., after the process cartridge 102 is mounted to the apparatus main body 100A.

In the state before the cartridge mounting shown in parts (a-1), (b-2), and (c-1) of FIG. 6, the sensor unit 400A is positioned in the non-detection position by the urging force F1 of the above-described urging spring 454. Further, the sensor unit 400A is positioned in the non-detection position, and therefore, the shutter 456 is positioned in the shielding position.

As shown in parts (b-1) and (c-1) of FIG. 6, in the state before the cartridge mounting, when the sensor unit 400A is viewed from the Z direction, at least a part of opening regions of the detection openings 457*a* and 457*b* is shielded by the shutter 456. "when . . . viewed from the Z direction" shows a state of the detecting device 400 when an object is viewed from the Z direction side toward the −Z direction with respect to the object, i.e., when the object is viewed in the optical axis direction of the light emitting portion 200*a* in this embodiment. Further, in the state before the cartridge mounting, when the sensor unit 400A is viewed from the Z direction, at least a part of the light emitting element 451*a* or at least a part of the light receiving element 451*b* is positioned inside the opening region of the detection opening 457*a* or 457*b* in a state of being shielded by the shutter 456. In this embodiment, the part of the light emitting element 451*a* and the part of the light receiving element 451*b* are positioned inside the opening regions of the detection openings 457*a* and 457*b* and are shielded by the shutter 456. A remaining portion of the light emitting element 451*a* and a remaining portion of the light receiving element 451*b* are positioned outside the opening regions of the detection openings 457*a* and 457*b* and are shielded by the frame 457.

Thus, in the state before the cartridge mounting, the shutter 456 shields the detecting elements (451*a*, 451*b*) so that the detecting elements (451*a*, 451*b*) are not exposed through the detection openings 457*a* and 457*b*. For this reason, for example, the detecting elements (451*a*, 451*b*) are protected from contaminants such as scattered toner and dust, so that it is possible to suppress a lowering in detection accuracy due to deposition of the contaminants.

As shown in part (a-1) of FIG. 6, in the state before the cartridge mounting, the positioning guide 455 is in an interference positional relationship with the light guide cover 420 of the process cartridge 102 to be inserted into the apparatus main body 100A in the X direction and the Y direction. That is, the contact portion 455*b* of the positioning guide 455 projects toward the −X direction side relative to the contact portion 420*c* which is an end portion of the light guide cover 420 on the X direction side (part (a-1) of FIG. 6). Further, the contact portion 455*a* of the positioning guide 455 projects toward the −Y direction side relative to a position (part (a-3) of FIG. 6), after the cartridge mounting, of the contact portion 420*d* which is an end portion of the light guide cover 420 on the Y direction side.

As shown in parts (a-2) and (a-3) of FIG. 6, with an operation in which the process cartridge 102 is inserted into the mounting direction D, the positioning guide 455 is pressed by the light guide cover 420, so that the sensor unit 400A is moved in a movement direction M1.

Specifically, as shown in part (a-2) of FIG. 6, during the cartridge mounting, the contact portion 420*c* of the light guide cover 420 contacts the contact portion 455*b* of the positioning guide 455. The contact portion 455*b* is pressed, so that the end portion of the positioning guide 455 on the −Y direction side is moved in the X direction, and thus the sensor unit 400A is in an inclined state. Further, in interrelation with movement of the sensor unit 400A, movement of the shutter 456 is started (part (c-2) of FIG. 6).

Incidentally, the end portion of the contact portion 455*b* on the −Y direction side may preferably be provided with a tapered portion toward the −Y direction on the X direction side. By this, the light guide cover 420 contacts the tapered portion, so that the detecting device 400 main body can be moved smoothly.

When the process cartridge 102 is further inserted in the mounting direction D from the state of part (a-2) of FIG. 6, as shown in part (a-3) of FIG. 6, the contact portion 420*d* of the light guide cover 420 contacts the contact portion 455*a* of the positioning guide 455. The contact portion 455*a* of the positioning guide 455 is pressed by the contact portion 420*d* of the light guide cover 420, so that the sensor unit 400A is moved in the Y direction.

When the process cartridge 102 reaches a predetermined mounting position, in a state in which the contact portions 455*a* and 455*b* of the positioning guide 455 contact the contact portions 420*c* and 420*d* of the light guide cover 420, the sensor unit 400A is positioned in the detection position. The detection position is a position moved obliquely in the X direction and the Y direction from the non-detection position (part (a-1) of FIG. 6). That is, the movement direction M1 in which the sensor unit 400A is moved from the non-detection position toward the detection position is a direction opposite to the direction of the urging force F1 of the urging spring 454 with respect to the X direction and opposite to the direction of the urging force F1 of the urging spring 454 with respect to the Y direction.

Thus, the sensor unit 400A is moved against the urging force F1 of the urging spring 454 by a force received from the process cartridge 102 during the mounting of the process cartridge 102, so that the sensor unit 400A is moved from the non-detection position to the detection position.

Further, with the movement of the sensor unit 400A to the detection position, the shutter 456 is moved to the exposure position (part (c-3) of FIG. 6). In this embodiment, with movement of the projection portion 455*c* of the positioning guide 455, the guiding portion 456*b* of the shutter 456 is pressed by the projection portion 455*c*, so that the shutter 456 is moved (rotated) about the supporting shaft 456*a* in a movement direction M2. By this, the shutter 456 is retracted to the exposure position where the shielding portion 456*c* does not shield the light emitting element 451*a* and the light receiving element 451*b*.

Incidentally, the movement direction M2 of the shutter 456 when the shutter 456 is moved from the shielding position toward the exposure position is a direction different from the movement direction M1 of the sensor unit 400A when the sensor unit 400A is moved from the non-detection position to the detection position. By providing the shutter 456 moved in the direction different from the movement direction of the sensor unit 400A, as described later, it is possible to provide a specific constitution capable of downsizing the apparatus main body 100A.

Further, when the sensor unit 400A is viewed from the Z direction in the state (part (c-1) of FIG. 6) before the cartridge mounting, each of a distance from a rotation center of the shutter 456 to the light emitting element 451*a* and a distance from the rotation center to the light receiving element 451*b* is longer than a distance from the rotation center to the projection portion 455*c*. By this, even when a movement amount of the projection portion 455*c* (a movement amount of the sensor unit 400A) is made small, it is possible to ensure a movement amount of a portion, of the shutter 456, which shields the detecting elements (451*a*, 451*b*). That is, it becomes easy to realize a state in which the detecting elements are sufficiently shielded and a state in which the detecting elements are sufficiently exposed. Incidentally, the distance from the rotation center of the shutter 456 to the projection portion 455*c* is based on a maximum value of the distance from the rotation center of the shutter 456 to the projection portion 455*c* in a period from before the process cartridge 102 is mounted to after the process cartridge 102 is mounted.

Further, the guiding portion 456*b* is formed in a groove shape in which the projection portion 455*c* engages. For this reason, a change in distance from the projection portion 455*c* to the rotation center of the shutter 456 with the movement of the sensor unit 400A is permitted.

In the state after the cartridge mounting shown in parts (a-3), (b-3), and (c-3) of FIG. 6, the sensor unit 400A is positioned in the detection position. Further, the sensor unit 400A is positioned in the detection position, and therefore, the shutter 456 is positioned in the exposure position.

As shown in parts (b-3) and (c-3) of FIG. 6, in the state after the cartridge mounting, when the sensor unit 400A is viewed from the Z direction, the light emitting element 451*a* and the light receiving element 451*b* are not shielded by the shutter 456 and are exposed to the inside of the detection openings 457*a* and 457*b*. Further, in the state after the cartridge mounting, the light emitting element 451*a* opposes the first light guiding portion 410*a* of the light guide 410 through the detection opening 457*a*, and the light receiving element 451*b* opposes the second light guiding portion 410*b* of the light guide 410 through the detection opening 457*b*. That is, in the state after the cartridge mounting, the detecting elements (451*a*, 451*b*) oppose the light input portion (first surface a1, part (b) of FIG. 2) and the light output portion (fourth surface b4) through the detection openings 457*a* and 457*b*, respectively.

For this reason, the detection light L emitted by the light emitting element 451*a* is emitted to the spatial optical path L1 (part (c) of FIG. 2) in the process cartridge 102 through the first light guiding portion 410*a* and then enters the light receiving element 451*b* through the second light guiding portion 410*b*, so that an optical path is formed. Accordingly, in the state after the cartridge mounting, the detecting device 400 is in a state in which the remaining toner amount of the toner in the process cartridge 102 is detectable by using the detection light L emitted by the light emitting element 451*a*. In other words, the controller 200 of the apparatus main body 100A is capable of acquiring the remaining toner amount of the toner in the process cartridge 102 on the basis of a detection signal from the detecting device 400.

In this embodiment, in a process in which the process cartridge 102 is mounted to the apparatus main body 100A, the positioning guide 455 is contacted to the light guide cover 420, so that the sensor unit 400A is positioned to the light guide cover 420. That is, in the state after the cartridge mounting, the light emitting element 451*a* and the light receiving element 451*b* of the sensor unit 400A are positioned on the basis of the light guide cover 420 engaging with the light guide 410.

By this constitution, detection accuracy of the remaining toner amount by the detecting device 400 can be improved. It is assumed that the positions of the light emitting element 451*a* and the light receiving element 451*b* are fixed irrespective of mounting and demounting of the process cartridge 102. In this case, due to factors such as manufacturing tolerances and assembling tolerances of component parts, and the like, in the state after the cartridge mounting, a relative position between each of the light emitting element 451*a* and the light receiving element 451*b* of the apparatus main body 100A and the light guide 410 of the process cartridge 102 can fluctuate. This relative position fluctuation causes a lowering in light receiving amount of the light receiving element 451*b* in some cases. For example, distances between the light emitting element 451*a* and the first surface a1 of the light guide 410 and between the light receiving element 451*b* and the fourth surface b4 of the light guide 410 are increased, and thus the number of times of refraction of the detection light L inside the light guide 410 is increased, so that the light receiving amount lowers in some cases. On the other hand, in this embodiment, the light emitting element 451*a* and the light receiving element 451*b* are positioned on the basis of the light guide cover 420, so that the light receiving amount of the light receiving element 451*b* can be more stabilized, and thus the detection accuracy of the remaining toner amount can be improved.

Incidentally, in the case where the process cartridge 102 is demounted from the apparatus main body 100A, the detecting device 400 operates in a reverse process to the above-described operation. That is, the light guide cover 420 is demounted from the positioning guide 455, and thus the sensor unit 400A slides toward a direction opposite to the movement direction M1 in accordance with the urging force F1 of the urging spring 454, so that the sensor unit 400A is moved from the detection position to the non-detection position. Then, in interrelation with the movement of the sensor unit 400A, the shutter 456 is rotated toward a direction opposite to the movement direction M2 and thus is moved from the exposure position to the shielding position. By this, in a state after the process cartridge 102 is demounted, the light emitting element 451*a* and the light receiving element 451*b* can be protected by the shutter 456.

Advantage of this Embodiment

As described above, the apparatus main body 100A of this embodiment includes the sensor unit 400A movable to the non-detection position and the detection position and the shutter 456 movable to the shielding position and the exposure position. In the case where the sensor unit 400A is viewed from the Z direction in a state in which the sensor unit 400A is positioned in the non-detection position and the shutter 456 is positioned in the shielding position, at least a part of the light emitting element 451*a* or at least a part of the light receiving element 451*b* is positioned inside the detection openings 457*a* and 457*b* and is shielded by the shutter 456 (part (b-1) of FIG. 6). Further, in a state in which the sensor unit 400A is positioned in the detection position and the shutter 456 is positioned in the exposure position, in the case where the sensor unit 400A is viewed from the Z direction, the light emitting element 451*a* and the light receiving element 451*b* are exposed to the inside of the detection openings 457*a* and 457*b* (part (b-3) of FIG. 6).

That is, when the detecting unit is positioned in the first position and the shielding member is positioned in the third position, in the case where the detecting unit is viewed in an optical axis direction of the light emitting portion, at least a part of the light emitting portion or at least a part of the light receiving portion is positioned inside the opening in a state of being shielded by the shielding member. Further, when the detecting unit is positioned in the second position and the shielding member is positioned in the fourth position, in the case where the detecting unit is viewed in the optical axis direction, the light emitting portion and the light receiving portion are positioned inside the opening in a state of being not shielded by the shielding member.

According to this constitution while suppressing the movement amount of the sensor unit 400A to small, it is possible to switch a state in which the light emitting element 451*a* and the light receiving element 451*b* are shielded with respect to the detection openings 457*a* and 457*b* and a state in which these elements 451*a* and 451*b* are exposed with respect to the detection openings 457*a* and 457*b*. Specifically, as a comparison example to this embodiment, a constitution in which the shutter 456 is not provided will be assumed. In this case, it would be considered that the non-detection position of the sensor unit 400A is set to a position for away from the detection position than the non-detection position in this embodiment is and that the light emitting element 451*a* and the light receiving element 451*b* are positioned outside the detection openings 457*a* and 458*b*. By this, in a state in which the sensor unit 400A is positioned in the non-detection position, the light emitting element 451*a* and the light receiving element 451*b* are shielded by the frame 457. However, in this comparison example, when the non-detection position is set so that the light emitting element 451*a* and the light receiving element 451*b* are sufficiently shielded by the frame 457, a movement distance between the detection position and the non-detection position becomes longer than that in this embodiment. For that reason, a space necessary to arrange the sensor unit 400A becomes large and leads to upsizing of the apparatus main body 100A.

On the other hand, according to the constitution of this embodiment, both the sensor unit 400A and the shutter 456 are moved, so that a state in which the light emitting element 451*a* and the light receiving element 451*b* are shielded and a state in which both elements are exposed can be switched. For this reason, while shortening the movement distance of the sensor unit 400A, it is possible to realize the state in which the light emitting element 451*a* and the light receiving element 451*b* are shielded and the state in which both elements are exposed. That is, according to this embodiment, the space saving of the remaining toner amount detecting mechanism can be realized, so that downsizing of the apparatus main body 100A can be realized.

Further, according to the constitution of this embodiment, in the image forming apparatus 100 provided with the apparatus main body 100A and the process cartridge 102, the space saving of the remaining toner amount detecting mechanism is realized, so that the downsizing of the image forming apparatus 100 can be realized. The process cartridge 102 referred to herein is a cartridge (first cartridge) provided with the detecting device 400 of the apparatus main body 100A and the light guide 410 and the like constituting the remaining toner amount detecting mechanism of a light transmission type.

Modified Embodiment

As a modified embodiment, an image forming apparatus in which a process cartridge 102A (second cartridge) provided with no constitution of a light transmission type for detecting the remaining toner amount is mounted to the image forming apparatus main body (apparatus main body 100A) common to the first embodiment and this modified embodiment will be described. The constitution of the light transmission type for detecting the remaining toner amount refers to the light guide 410 and the light guide cover 420 in this modified embodiment. The constitution of the apparatus main body 100A is the same as the first embodiment, and therefore, will be omitted from description.

FIG. 7 is a perspective view of the process cartridge 102A in the modified embodiment. The process cartridge 102A can be mounted to the apparatus main body 100A instead of the process cartridge 102 (part (a) of FIG. 2) in the first embodiment. The image forming apparatus in a state in which the process cartridge 102A is mounted to the apparatus main body 100A is capable of executing an image forming operation with use of the process cartridge 102A.

In the case where the process cartridge 102A is mounted to the apparatus main body 100A, the controller 200 of the apparatus main body 100A detects the remaining toner amount of the toner inside the process cartridge 102A by a remaining toner amount detecting means of a type other than the light transmission type. In other words, the image forming apparatus main body of this embodiment includes a control means capable of acquiring an amount of the developer in the toner accommodating portion 105 (accommodating portion) of the process cartridge 102 without using the above-described detecting unit.

For example, the controller 200 can calculate a toner consumption amount and a present remaining toner amount by a pixel count type. In the pixel count type, an estimated value of the toner consumption amount is calculated on the basis of an amount of the toner consumed per pixel and an integrated value (pixel count) of the number of pixels forming an image based on image information (print data) inputted to the image forming apparatus.

Then, the estimated value of the toner consumption amount is subtracted from a toner amount (initial toner amount) of the toner filled in the process cartridge 102A in an unused state, so that the remaining toner amount is acquired. The initial toner amount is stored in advance in the storing portion or can be read from a storing medium mounted to the process cartridge 102A.

Incidentally, the pixel count type is an example of a means for detecting the remaining toner amount of the toner inside the cartridge without using the detection light, and another type may also be used. For example, the controller 200 of the apparatus main body 100A may acquire the remaining toner amount on the basis of the initial toner amount of the process cartridge 102A and the estimated value of the toner consumption amount based on the number of sheets subjected to cumulative image formation from a point of a time when the process cartridge 102A is mounted.

The process cartridge 102A is provided with the detecting unit 15 including the toner accommodating portion 105. The process cartridge 102A basically has the same constitution as the constitution of the process cartridge 102 (part (a) of FIG. 2) in the first embodiment except that the process cartridge 102A does not include the light guide 410 and the light guide cover 420. Further, the process cartridge 102A does not include a portion contacting the positioning guide 455 (parts (a) and (b) of FIG. 4) of the detecting device 400 when the process cartridge 102A is mounted to the apparatus main body 100A.

In the case where the process cartridge 102A is inserted into the apparatus main body 100A, a part of the process cartridge 102A is mounted in a predetermined mounting position without contacting the positioning guide 455 of the detecting device 400. For that reason, the sensor unit 400A remains in the non-detection position throughout before and after the mounting of the process cartridge 102A. Further, the shutter 456 remains in the shielding position throughout before and after the mounting of the process cartridge 102A. That is, even in either of a state in which the above-described contact is not mounted to the image forming apparatus main body and a state in which the contact is mounted to the image forming apparatus main body, the detecting unit is positioned in the first position and the shielding member is positioned in the third position.

In this modified embodiment, even in the state in which the process cartridge 102A is mounted to the apparatus main body 100A, a state in which the light emitting element 451*a* and the light receiving element 451*b* are shielded by the shutter 456 is maintained. For this reason, the light emitting element 451*a* and the light receiving element 451*b* can be prevented from being unnecessarily exposed through being unnecessary to detect the remaining toner amount, so that a degree of deposition of the toner or the like on the light emitting element 451*a* and the light receiving element 451*b* can be reduced. Further, it is possible to reduce a possibility that an image defect is caused by irradiating the photosensitive drum 101 with the detection light L, as leaked light (stray light), emitted from the light emitting element 451*a* although being unnecessary to detect the remaining toner amount.

Thus, the image forming apparatus of this modified embodiment includes, similarly as in the first embodiment, the apparatus main body 100A provided with a constitution in which the shutter 456 is opened during the mounting of the process cartridge 102 provided with the constitution of the light transmission type for detecting the remaining toner amount. For this reason, the apparatus main body 100A is adaptable to the process cartridge 102 provided with the constitution of the light transmission type for detecting the remaining toner amount.

Moreover, in the image forming apparatus of this modified embodiment, a state in which the light emitting element 451*a* and the light receiving element 451*b* are shielded by the shutter 456 is maintained during mounting of the process cartridge 102A including no constitution of the light transmission type for detecting the remaining toner amount. Accordingly, in the case where the process cartridge 102A including no constitution of the light transmission type for detecting the remaining toner amount is mounted, it is possible to provide an image forming apparatus capable of reducing a degree of deposition of the toner or the like on the light emitting element 451*a* and the light receiving element 451*b*. Further, in the case where the process cartridge 102A is mounted, it is possible to provide an image forming apparatus capable of reducing an occurrence of the image defect due to the leaked light.

Another Modified Embodiment

In the first embodiment, the constitution in which the sensor unit 400A is positioned by contact of the light guide cover 420 of the process cartridge 102 with the positioning guide 455 of the apparatus main body 100A was described. The present invention is not limited thereto, but a constitution in which the sensor unit 400A is positioned to the light guide 410 by contact of a part of the process cartridge 102 with a member moved integrally with the sensor unit 400A or a member interrelated with the sensor unit 400A may be employed. For example, a constitution in which during the mounting of the process cartridge 102, the sensor unit 400A is positioned by contact of a part of the light guide 410 with the substrate holder 450 may be employed.

Second Embodiment

Subsequently, an image forming apparatus according to a second embodiment will be described. In the second embodiment, a detecting device 401 different in part of constitution from the detecting device 401 in the first embodiment is used. In the following description, elements to which reference numerals or symbols common to the first and second embodiments substantially have the same constitutions and actions as those described in the first embodiment, and in this embodiment, a portion different from the first embodiment will be principally described.

<Detecting Device>

Part (a) of FIG. 8 is a perspective view of the detecting device 401 in the second embodiment. Part (b) of FIG. 8 is an exploded view of the detecting device 401. Part (c) of FIG. 8 is a perspective view showing a shutter 460, a shutter urging spring 461, and the frame 457 of the detecting device 401. Part (d) of FIG. 8 is a perspective view showing the shutter 460 and the substrate holder 450 of the detecting device 401. Incidentally, in part (a) of FIG. 8, the urging spring 454, the positioning member 449 (FIG. 5), and the frame 457 (part (b) of FIG. 4) are omitted from illustration.

As shown in parts (a) and (b) of FIG. 8, the detecting device 401 includes the sensor substrate 451, the substrate holder 450, the positioning guide 455, the shutter 460, and the shutter urging spring 461. Of the detecting device 401, a constitution of a portion excluding the shutter 460, the shutter urging spring 461 and the substrate holder 450 is basically the same as the corresponding portion of the detecting device 400 in the first embodiment.

In the following, the sensor substrate 451, the substrate holder 450, and the positioning guide 455 are collectively referred to as a "sensor unit 401A". The sensor unit 401A is movable to a non-detection position (first position, stand-by position) and a detection position (second position).

As shown in parts (a) and (b) of FIG. 8, the shutter 460 is disposed between the substrate holder 450 and the frame 457 in the Z direction. To the shutter 460, one end of the shutter urging spring 461 (tension spring) is attached. Further, the other end of the shutter urging spring 461 is attached to a guiding portion 449*d* (part (c) of FIG. 8) of a positioning member 449 fixed to the frame 457. The shutter 460 is urged in the −X direction by an urging force F2 of the shutter urging spring 461.

The shutter 460 is an example of a shielding member (openable member) movable relative to both the frame 457 and the sensor unit 401A. The shutter 460 is movable to a shielding position (third position) and an exposure position (fourth position, retracted position). The shielding position (third position) is a position of the shutter 460 when the process cartridge 102 is not mounted to the apparatus main body 100A. The exposure position (fourth position) is a position of the shutter 460 when the process cartridge 102 is mounted to the apparatus main body 100A.

The exposure position in this embodiment is a position moved from the shielding position in the −X direction. That is, the shutter 460 can be moved from the shielding position to the exposure position in accordance with the urging force F2 of the shutter urging spring 461. Further, the shutter 460 can be moved from the exposure position to the shielding position by being moved in the +X direction against the urging force F2. The shutter urging spring 461 is an example of an urging means (second urging means) for urging the shutter 460 as the shielding member toward the exposure position (fourth position), and a spring member other than the tension spring or elastomer may be used.

The shutter 460 includes a guided portion 460*b* guided by the guiding portion 449*d*, the guided portion 460*b* in this embodiment is engaged with the guiding portion 449*d* having a projection shape and forms a groove shape extending in the X direction. The shutter 460 is guided by the guiding portion 449*d* and is linearly moved along a movement direction M3 (slide movement) crossing a movement direction M1 (part (b-3) of FIG. 9) of the sensor unit 401A.

Incidentally, the movement direction M3 of the shutter 460 in this embodiment is a direction along the X direction (longitudinal direction of the process cartridge 102), but a constitution in which the shutter 460 is moved along another direction may be employed. For example, a constitution in which the shutter 460 is linearly moved in the Y direction (the mounting direction D of the process cartridge 102) may be employed, or the movement direction M3 may also be a direction obliquely crossing the X direction and the Y direction. In such a case, the guiding portion 449*d* and the guided portion 460*b* are formed in a direction and a shape which are conformed to the movement direction of the shutter 460. Further, the shutter urging spring 461 is changed in arrangement to an arrangement conformed to the movement direction of the shutter 460.

As shown in part (d) of FIG. 8, the substrate holder 450 includes a projection portion 450*a*, and the shutter 460 includes a contacted portion 460*a* to which the projection portion 450*a* is contacted. The projection portion 450*a* projects in a projection height, where the projection portion 450*a* interferes with the shutter 460 in the X direction, toward the Z direction side of the substrate holder 450. That is, a position of the projection portion 450*a* with respect to the Z direction overlaps with a position of the contacted portion 460*a* with respect to the Z direction. The projection portion 450*a* functions as a restricting portion for restricting relative movement of the shutter 4460 to the substrate holder 450 in the −X direction. In other words, the projection portion 450*a* is an example of the restricting portion for restricting movement of the shielding member from the third position toward the fourth position in the case where the detecting unit is positioned in the first position. Further, the projection portion 450*a* permits the movement of the shielding member from the third position toward the fourth position in the case where the detecting unit is moved from the first position to the second position.

<Operation During Mounting of Cartridge>

Using respective views of FIG. 9, an operation of the detecting device 401 during mounting of the process cartridge 102 to the apparatus main body 100A will be described.

Incidentally, movement of the positioning guide 455 of the detecting device 401 by being pressed by the light guide cover 420 of the process cartridge 102 is the same as the movement in the first embodiment (parts (a-1) to (a-3) of FIG. 6), and therefore, will be omitted from description.

Parts (a-1) to (a-3) of FIG. 9 are schematic views in which the detection openings 457*a* and 457*b* and the detecting elements (451*a*, 451*b*) of the detecting device 401 and the first and second light guiding portions 410*a* and 410*b* of the light guide 410 of the process cartridge 102 are viewed from Z direction. Parts (b-1) to (b-4) of FIG. 9 are schematic views in which the shutter 460, the shutter urging spring 461, and the substrate holder 450 of the detecting device 400 are viewed from Z direction. In the respective views of FIG. 9, only a part of constituent elements of the remaining toner amount detecting means in this embodiment is shown, and other constituent elements are omitted from illustration.

In the state before the cartridge mounting shown in parts (a-1), and (b-1) of FIG. 9, the sensor unit 401A is positioned in the non-detection position by an urging force F1 of an urging spring 454. Further, when the sensor unit 401A is positioned in the non-detection position, the projection portion 450*a* of the substrate holder 450 contacts the contacted portion 460*a* of the shutter 460. For this reason, the shutter 460 is held in the shielding position against an urging force F2 of the shutter urging spring 461.

As shown in parts (a-1) and (c-1) of FIG. 9, in the state before the cartridge mounting, when the sensor unit 401A is viewed from the Z direction, at least a part of opening regions of the detection openings 457*a* and 457*b* is shielded by the shutter 460. Further, in the state before the cartridge mounting, when the sensor unit 401A is viewed from the Z direction, at least a part of the light emitting element 451*a* or at least a part of the light receiving element 451*b* is positioned inside the opening region of the detection opening 457*a* or 457*b* and is shielded by the shutter 460.

Thus, in the state before the cartridge mounting, the shutter 460 shields the detecting elements (451*a*, 451*b*) so that the detecting elements (451*a*, 451*b*) are not exposed through the detection openings 457*a* and 457*b*. For this reason, for example, the detecting elements (451*a*, 451*b*) are protected from contaminants such as scattered toner and dust, so that it is possible to suppress a lowering in detection accuracy due to deposition of the contaminants.

As shown in parts (a-2), (a-3), (b-2), and (b-3) of FIG. 9, in a process in which the process cartridge 102 is inserted into the mounting direction D, the sensor unit 401A is pressed by the light guide cover 420, so that the sensor unit 401A is moved in a movement direction M1. That is, in the interrelation with the insertion of the process cartridge 102, a position of the sensor unit 401A in the Y direction changes.

On the other hand, the shutter 460 is constituted so as to move in the X direction relative to the positioning member 449 and the frame 457, and therefore, a position of the shutter 460 is not changed in interrelation with the insertion of the process cartridge 102. For that reason, with the insertion of the process cartridge 102, a relative position between the substrate holder 450 and the shutter 460 in the Y direction changes.

Then, until the process cartridge 102 reaches the mounting position, as shown in part (b-3) of FIG. 9, the projection portion 450*a* of the substrate holder 450 is demounted from the contacted portion 460*a* of the shutter 460. As a result, the shutter 460 is slid in the −X direction in accordance with the urging force F2 of the shutter urging spring 461, and is moved from the shielding position to the exposure position. In other words, in this embodiment, a movement direction of the detecting unit relative to the opening member and a movement direction of the shielding member relative to the opening member are different from each other. Further, by relative movement between the detecting unit and the shielding member when the detecting unit is moved from the first position to the second position, the restricting portion is demounted from the shielding member. By this, movement of the shielding member is realized.

As shown in parts (a-3) and (b-3) of FIG. 9, in the state after the cartridge mounting, when the sensor unit 401A is viewed from the Z direction, the light emitting element 451*a* and the light receiving element 451*b* are not shielded by the shutter 460 and are exposed to the inside of the detection openings 457*a* and 457*b*. Further, in the state after the cartridge mounting, the light emitting element 451*a* opposes the first light guiding portion 410*a* of the light guide 410 through the detection opening 457*a*, and the light receiving element 451*b* opposes the second light guiding portion 410*b* of the light guide 410 through the detection opening 457*b*. Accordingly, the detecting device 401 is in a state in which the remaining toner amount of the toner in the process cartridge 102 is detectable by using the detection light L emitted by the light emitting element 451*a*.

Also, in this embodiment, the light emitting element 451*a* and the light receiving element 451*b* of the sensor unit 401A are positioned on the basis of the light guide cover 420. For this reason, a light receiving amount of the light receiving element 451*b* can be more stabilized, so that detection accuracy of the remaining toner amount can be improved.

Incidentally, in the case where the process cartridge 102 is demounted from the apparatus main body 100A, the light guide cover 420 is demounted from the positioning guide 455. Further, as shown in part (b-4) of FIG. 9, the sensor unit 401A slides toward a direction opposite to the movement direction M1 in accordance with the urging force F1 of the urging spring 454, so that the sensor unit 401A is moved from the detection position to the non-detection position.

With the movement of the sensor unit 401A, the projection portion 450*a* of the substrate holder 450 slides with an edge 460*c* of the shutter 460. On a contact surface between the projection portion 450*a* and the edge 400*c*, a pressing force F4 acting the shutter 460 includes a component with respect to the X direction which is a direction perpendicular to the contact surface. By the component of this pressing force F4 with respect to the X direction, the shutter 460 is moved in the X direction while expanding the shutter urging spring 461, and is returned to the shielding position. The edge 460*c* of the shutter 460 is an example of a second pressed portion. That is, the shielding member in this embodiment is pressed at the second pressed portion by the detecting unit when the detecting unit is moved from the second position to the first position by the urging force of the urging means, so that the shielding member is moved from the fourth position to the third position against the urging force of the second urging means. By this, movement of the shielding member interrelated with the detecting unit is realized. Incidentally, until the sensor unit 401A reaches the non-detection position, the projection portion 450*a* contacts again the contacted portion 460*a* of the shutter 460.

Incidentally, in order to make the component of the pressing force F4 in the X direction (component with respect to a direction in which the shutter 460 is moved from the exposure position toward the shielding position) larger, for example, inclination of the edge 460*c* toward the −Y direction side may be made larger than that illustrated in FIG. 9. Further, a frictional force acting from the projection portion 450*a* onto the edge 460*c* includes the component in the −X direction, and therefore, in order that the frictional force does not disturb the movement of the shutter 460 toward the shielding position, for example, the projection portion 450*a* may be a rotatable roller or may be formed of a material high in sliding property. The present invention is not limited thereto, and a movement direction of the shutter 460 and an urging direction of the shutter urging spring 461 are made, for example, a direction perpendicular to a direction of the urging force F1 of the urging spring 454, so that the shutter 460 may be smoothly moved from the exposure position to the shielding position.

Further, the contact portion of the sensor unit 401A with the shutter 460 when the shutter 460 is moved from the exposure position to the shielding position may be a portion other than the projection portion 450*a* and a portion other than the edge 460*c*.

Advantage of this Embodiment

As described above, the apparatus main body 100A of this embodiment includes the sensor unit 401A movable to the non-detection position and the detection position and the shutter 460 movable to the shielding position and the exposure position. In the case where the sensor unit 401A is viewed from the Z direction in a state in which the sensor unit 401A is positioned in the non-detection position and the shutter 460 is positioned in the shielding position, at least a part of the light emitting element 451*a* or at least a part of the light receiving element 451*b* is positioned inside the detection openings 457*a* and 457*b* and is shielded by the shutter 460 (part (a-1) of FIG. 9). Further, in a state in which the sensor unit 401A is positioned in the detection position and the shutter 460 is positioned in the exposure position, in the case where the sensor unit 401A is viewed from the Z direction, the light emitting element 451*a* and the light receiving element 451*b* are exposed to the inside of the detection openings 457*a* and 457*b* (part (a-3) of FIG. 9).

That is, when the detecting unit is positioned in the first position and the shielding member is positioned in the third position, in the case where the detecting unit is viewed in an optical axis direction of the light emitting portion, at least a part of the light emitting portion or at least a part of the light receiving portion is positioned inside the opening in a state of being shielded by the shielding member. Further, when the detecting unit is positioned in the second position and the shielding member is positioned in the fourth position, in the case where the detecting unit is viewed in the optical axis direction, the light emitting portion and the light receiving portion are positioned inside the opening in a state of being not shielded by the shielding member.

According to the constitution of this embodiment, both the sensor unit 401A and the shutter 460 are moved, so that a state in which the light emitting element 451*a* and the light receiving element 451*b* are shielded and a state in which both elements are exposed can be realized. For this reason, it is possible to shorten each of a movement distance of the sensor unit 401A and a movement distance of the shutter 456 and then realize the space saving of the remaining toner amount detecting mechanism. Further, downsizing of the apparatus main body 100A can be realized.

Further, in this embodiment, the projection portion 450*a* as the restricting portion for restricting the movement of the shutter 460 in addition to the movement of the shutter 460 from the shielding position to the exposure position by the urging force F2 of the shutter urging spring 461 is provided. By this constitution, a retraction amount of the shutter 460 from the detection openings 457*a* and 457*b* can be easily ensured, so that a space for arrangement of the shutter 460 can be saved.

Third Embodiment

Subsequently, an image forming apparatus according to a third embodiment will be described. In the third embodiment, a detecting device 402 different in part of constitution from the detecting device 401 in the first embodiment is used. In the following description, elements to which reference numerals or symbols common to the first and second embodiments substantially have the same constitutions and actions as those described in the first embodiment, and in this embodiment, a portion different from the first embodiment will be principally described.

<Detecting Device>

Part (a) of FIG. 10 is a perspective view of the detecting device 402 in the third embodiment. Part (b) of FIG. 10 is a perspective view showing a shutter 462, a shutter urging spring 463, and a positioning guide 455 of the detecting device 402. Incidentally, in part (a) of FIG. 10, the urging spring 454, the positioning member 449 (FIG. 5), and the frame 457 (part (b) of FIG. 4) are omitted from illustration.

As shown in parts (a) and (b) of FIG. 10, the detecting device 402 includes the sensor substrate 451, the substrate holder 450, the positioning guide 455, the shutter 462, and the shutter urging spring 463. Of the detecting device 402, a constitution of a portion excluding the shutter 462, the shutter urging spring 463 and the positioning guide 455 is basically the same as the corresponding portion of the detecting device 400 in the first embodiment.

In the following, the sensor substrate 451, the substrate holder 450, and the positioning guide 455 are collectively referred to as a "sensor unit 402A". The sensor unit 402A is movable to a non-detection position (first position, stand-by position) and a detection position (second position).

As shown in parts (a) and (b) of FIG. 10, the shutter 462 includes a projection portion 462*a* and a portion-to-be-guided 462*b*. The shutter 462 is disposed so that the projection portion 462*a* projects toward an inside (−X direction side) relative to a contact portion 455*b* of the positioning guide 455. The shutter 462 is movable (capable of advancing and retracting) in a movement direction M4 (parts (a-2) and (b-2) of FIG. 11) in which the projection portion 462*a* projects toward and is retracted from the contact portion 455*b* of the positioning guide 455. The movement direction M4 is a direction crossing a movement direction M1 (parts (a-3) and (b-3) of FIG. 11) of the sensor unit 402A during the cartridge mounting. The projection portion 462*a* is an example of a third pressed portion pressed by a part of the process cartridge 102 during the mounting of the process cartridge 102.

The portion-to-be-guided 462*b* engages with a guiding portion 455*f* provided on the positioning guide 455. The portion-to-be-guided 462*b* is guided by the guiding portion 455*f*, so that the shutter 462 is movably supported by the sensor unit 402A. That is, the shielding member in this embodiment is supported by the detecting unit and is movable in a direction in which with respect to the detecting unit, the third pressed portion projects toward and is retracted from the above-described pressed portion.

The shutter urging spring 463 is mounted inside the positioning guide 455. The shutter urging spring 463 is a torsion coil spring engaged with the positioning guide at one end thereof and engaged with the shutter 462 at the other end thereof. The shutter 462 is urged in the −X direction by an urging force F3 of the shutter urging spring 463.

The shutter 462 is an example of a shielding member (openable member) movable relative to both the frame 457 and the sensor unit 402A. The shutter 462 is movable to a shielding position (third position) and an exposure position (fourth position, retracted position). The shielding position (third position) is a position of the shutter 462 when the process cartridge 102 is not mounted to the apparatus main body 100A. The exposure position (fourth position) is a position of the shutter 462 when the process cartridge 102 is mounted to the apparatus main body 100A.

The exposure position in this embodiment is a position moved from the shielding position in the X direction. That is, the shutter 462 can be moved from the exposure position to the shielding position by being moved in the −X direction in accordance with the urging force F3 of the shutter urging spring 463. Further, the shutter 462 can be moved from the shielding position to the exposure position by being moved in the X direction against the urging force F3. The shutter urging spring 463 is an example of an urging means (third urging means) for urging the shutter 462 as the shielding member toward the exposure position, and a spring member other than the torsion coil spring or elastomer may be used.

Incidentally, the shutter 462 is an example of the shielding member capable of moving toward and away from the positioning guide 455 and the sensor unit 402A, and the movement direction of the shutter 462 is capable of being appropriately changed. For example, a constitution in which the shutter 462 is capable of advancing to and being retracted from the positioning guide 455 in a direction along the mounting direction D (Y direction) of the process cartridge 102 may also be employed. Further, for example, a constitution in which the shutter 462 is capable of advancing to and being retracted from the positioning guide 455 by being rotationally moved relative to the sensor unit 402A.

<Operation During Mounting of Cartridge>

Next, using respective views of FIG. 11, an operation of the detecting device 402 during mounting of the process cartridge 102 to the apparatus main body 100A will be described.

Incidentally, movement of the positioning guide 455 of the detecting device 402 by being pressed by the light guide cover 420 of the process cartridge 102 is the same as the movement in the first embodiment (parts (a-1) to (a-3) of FIG. 6), and therefore, will be omitted from description.

Parts (a-1) to (a-3) of FIG. 11 are schematic views in which the positioning guide 455 and the shutter 462 of the detecting device 402 and the light guide cover 420 of the process cartridge 102 are viewed from Z direction. Parts (b-1) to (b-3) of FIG. 11 are schematic views in which the shutter 462, the shutter urging spring 463, the substrate holder 450, and the sensor substrate 451 of the detecting device 400 are viewed from Z direction. In the respective views of FIG. 11, only a part of constituent elements of the remaining toner amount detecting means in this embodiment is shown, and other constituent elements are omitted from illustration.

In the state before the cartridge mounting shown in parts (a-1), and (b-1) of FIG. 11, the sensor unit 402A is positioned in the non-detection position by an urging force F1 of an urging spring 454. Further, the shutter 462 is positioned in the shielding position, where the projection portion 462*a* projections in the −X direction relative to the contact portion 455*b* of the positioning guide 455, by the urging force F3 of the shutter urging spring 463.

As shown in parts (a-1) and (c-1) of FIG. 11, in the state before the cartridge mounting, when the sensor unit 402A is viewed from the Z direction, at least a part of opening regions of the detection openings 457*a* and 457*b* is shielded by the shutter 462. In this embodiment, whole areas of the detection openings 457*a* and 457*b* is shielded by the shutter 462. Further, in the state before the cartridge mounting, when the sensor unit 402A is viewed from the Z direction, at least a part of the light emitting element 451*a* or at least a part of the light receiving element 451*b* is positioned inside the opening region of the detection opening 457*a* or 457*b* and is shielded by the shutter 462.

Thus, in the state before the cartridge mounting, the shutter 462 shields the detecting elements (451*a*, 451*b*) so that the detecting elements (451*a*, 451*b*) are not exposed through the detection openings 457*a* and 457*b*. For this reason, for example, the detecting elements (451*a*, 451*b*) are protected from contaminants such as scattered toner and dust, so that it is possible to suppress a lowering in detection accuracy due to deposition of the contaminants.

As shown in parts (a-2) and (b-2) of FIG. 11, in a process in which the process cartridge 102 is inserted into the mounting direction D, the contact portion 420*c* of the light guide cover 420 contacts the projection portion 462*a* of the shutter 462. Then, the shutter 462 is moved toward the X direction side (direction in which the projection portion 462*a* is accommodated inside the positioning guide 455) relative to the positioning guide 455 against the urging force of the shutter urging spring 463 by being pressed by the light guide cover 420. Then, when the process cartridge 102 is further inserted, the shutter 462 is retracted from the detection openings 457*a* and 457*b*.

Further, as shown in parts (a-3) and (b-3) of FIG. 11, in the state after the cartridge mounting, when the sensor unit 402A is viewed from the Z direction, the light emitting element 451*a* and the light receiving element 451*b* are not shielded by the shutter 460 and are exposed to the inside of the detection openings 457*a* and 457*b*. Further, in the state after the cartridge mounting, the light emitting element 451*a* opposes the first light guiding portion 410*a* of the light guide 410 through the detection opening 457*a*, and the light receiving element 451*b* opposes the second light guiding portion 410*b* of the light guide 410 through the detection opening 457*b*. Accordingly, the detecting device 401 is in a state in which the remaining toner amount of the toner in the process cartridge 102 is detectable by using the detection light L emitted by the light emitting element 451*a*.

Also, in this embodiment, the light emitting element 451*a* and the light receiving element 451*b* of the sensor unit 401A are positioned on the basis of the light guide cover 420. For this reason, a light receiving amount of the light receiving element 451*b* can be more stabilized, so that detection accuracy of the remaining toner amount can be improved.

Incidentally, in the case where the process cartridge 102 is demounted from the apparatus main body 100A, the shutter 462 is moved to the shielding position in accordance with the urging force F3 of the shutter urging spring 463 by demounting of the light guide cover 420 from the projection portion 462*a* of the shutter 462. In parallel to this, the light guide cover 420 is demounted from the contact portions 455*a* and 455*b* of the positioning guide 455, so that the sensor unit 402A is moved to the non-detection position in accordance with the urging force of the urging spring 454.

Further, in this embodiment, a constitution in which the light guide cover 420 of the process cartridge 102 presses the shutter 462 was described as an example, but a constitution in which the shutter 462 is pressed by another component (part) of the process cartridge 102 may be employed. For example, a constitution in which the shutter 462 is moved from the shielding position to the exposure position by being pressed by the light guide 410 may be employed.

Advantage of this Embodiment

As described above, the apparatus main body 100A of this embodiment includes the sensor unit 402A movable to the non-detection position and the detection position and the shutter 462 movable to the shielding position and the exposure position. In the case where the sensor unit 402A is viewed from the Z direction in a state in which the sensor unit 402A is positioned in the non-detection position and the shutter 462 is positioned in the shielding position, at least a part of the light emitting element 451*a* or at least a part of the light receiving element 451*b* is positioned inside the detection openings 457*a* and 457*b* and is shielded by the shutter 462 (part (a-1) of FIG. 11). Further, in a state in which the sensor unit 402A is positioned in the detection position and the shutter 462 is positioned in the exposure position, in the case where the sensor unit 402A is viewed from the Z direction, the light emitting element 451*a* and the light receiving element 451*b* are exposed to the inside of the detection openings 457*a* and 457*b* (part (a-3) of FIG. 11).

That is, when the detecting unit is positioned in the first position and the shielding member is positioned in the third position, in the case where the detecting unit is viewed in an optical axis direction of the light emitting portion, at least a part of the light emitting portion or at least a part of the light receiving portion is positioned inside the opening in a state of being shielded by the shielding member. Further, when the detecting unit is positioned in the second position and the shielding member is positioned in the fourth position, in the case where the detecting unit is viewed in the optical axis direction, the light emitting portion and the light receiving portion are positioned inside the opening in a state of being not shielded by the shielding member.

According to the constitution of this embodiment, both the sensor unit 402A and the shutter 462 are moved, so that a state in which the light emitting element 451*a* and the light receiving element 451*b* are shielded and a state in which both elements are exposed can be realized. For this reason, it is possible to shorten each of a movement distance of the sensor unit 402A and a movement distance of the shutter 456 and then realize the space saving of the remaining toner amount detecting mechanism. Further, downsizing of the apparatus main body 100A can be realized.

Further, in this embodiment, the shutter 462 is held in the shielding position by the shutter urging spring 463 (third urging means). Further, the shutter 462 is moved from the shielding position to the exposure position by being pressed at the projection portion 462*a* (third pressed portion) of the shutter 462 itself. Thus, the position of the shutter 462 in this embodiment is directly controlled by the urging force of the shutter urging spring 463 and pressing of the projection portion 462*a*, and is not influenced by the movement of the sensor unit 402A during the mounting of the process cartridge 102.

For this reason, while suppressing the movement amount of the sensor unit 402A to be small, it is possible to switch a state in which the detecting elements (451*a*, 451*b*) and the detection openings (457*a* and 457*b*) are sufficiently shielded and a state in which these detecting elements and detection openings are sufficiently exposed. Specifically, by increasing a stroke of the shutter urging spring 463, it becomes possible that a shielding area of the detection openings 457*a* and 457*b* is increased by the shutter 462 positioned in the shielding position. Further, a shape of the projection portion 462*a* is set so that a movement amount of the shutter 462 when pressed by the light guide cover 420 becomes large, so that an opening area of the detection openings 457*a* and 457*b* when the shutter 462 is positioned in the exposure position can be increased.

Other Embodiments

In the above-described embodiments, a constitution in which each of the process cartridges 102 and 102A provided with the photosensitive drum 101 is mounted to the apparatus main body 100A was described as an example. However, the "cartridge" is not limited to the process cartridge provided with the photosensitive drum, but may also be a developing cartridge including the developing roller and the toner accommodating portion. In this case, the developing cartridge is mounted and demounted from the apparatus main body independently from another cartridge provided with the photosensitive drum, for example. Further, the "cartridge" may also be a supply container (toner cartridge) in which the developer for being supplied to the developing unit including the developing roller is accommodated. In this case, the supply container is mounted and demounted from the apparatus main body independently from, for example, a process cartridge including a developing unit. Also, in these embodiments, the remaining toner amount (developer amount) of the toner (developer) in the cartridge can be detected by applying the constitution of the remaining toner amount detecting mechanism of the light transmission type described in the above-described embodiments.

According to the present invention, it is possible to provide a new technique relating to a constitution for optically detecting the amount of the developer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-107474 filed on Jun. 29, 2023, which is hereby incorporated by reference herein in its entirety.

What is claimed is:

1. An image forming apparatus comprising:

an apparatus main body; and a cartridge mountable to and demountable from the apparatus main body and provided with an accommodating portion configured to accommodate a developer, wherein the apparatus main body includes:

a frame provided with an opening;

an urging member;

a detecting unit (i) which includes a light emitting portion configured to emit light, a light receiving portion configured to receive the light emitted by the light emitting portion, and a pressed portion and (ii) which is configured to output a detection signal depending on a light receiving amount of the light received by the light receiving portion, wherein the detecting unit is provided movably relative to the frame between a first position and a second position, and is positioned in the first position by an urging force of the urging member, and wherein the detecting unit is moved from the first position to the second position against the urging force of the urging member by the pressed portion being pressed; and a shielding member provided movably relative to both the frame and the detecting unit between a third position and a fourth position, wherein the cartridge includes a light guiding member including a first light guiding portion configured to guide the light from the light emitting portion to an inside space of the accommodating portion and a second light guiding portion configured to guide the light passed through the inside space of the accommodating portion, wherein in a state in which the cartridge is not mounted to the apparatus main body, the detecting unit is positioned in the first position and the shielding member is positioned in the third position, wherein in a state in which the cartridge is mounted to the apparatus main body, the detecting unit is positioned in the second position and the shielding member is positioned in the fourth position, wherein when the detecting unit is positioned in the first position and the shielding member is positioned in the third position, in a case in which the detecting unit is viewed in an optical axis direction of the light emitting portion, at least one of at least a part of the light emitting portion and at least a part of the light receiving portion is positioned inside the opening, and the light emitting portion and the light receiving portion are shielded by the shielding member, and wherein when the detecting unit is positioned in the second position and the shielding member is positioned in the fourth position, both the light emitting portion and the light receiving portion are positioned inside the opening and are not shielded by the shielding member such that the light emitting portion opposes the first light guiding portion through the opening, and the light receiving portion opposes the second light guiding portion through the opening.

2. The image forming apparatus according to claim 1, wherein the cartridge includes a pressing portion, and wherein the detecting unit is moved from the first position to the second position by the pressed portion being pressed by the pressing portion of the cartridge while the cartridge is being mounted to the apparatus main body.

3. The image forming apparatus according to claim 1, wherein the detecting unit includes an engaging portion, and wherein the shielding member includes a portion-to-be-engaged configured to be engaged with the engaging portion of the detecting unit so that the shielding member is moved from the third position to the fourth position in interrelation with movement of the detecting unit from the first position to the second position.

4. The image forming apparatus according to claim 3, wherein the shielding member is rotatable relative to the frame, and wherein in a state in which the detecting unit is positioned in the first position and the shielding member is positioned in the third position, each of a distance from a rotation center of the shielding member to the light emitting portion and a distance from the rotation center to the light receiving portion is longer than a distance from the rotation center to the engaging portion of the detecting unit.

5. The image forming apparatus according to claim 3, wherein the detecting unit includes:

a substrate provided with the light emitting portion and the light receiving portion;

a substrate holder configured to hold the substrate;

a guiding member provided with the pressed portion; and a connecting portion configured to connect the guiding member and the substrate holder so that the substrate, the substrate holder, and the guiding member are integrally moved, and wherein the engaging portion is the connecting portion.

6. The image forming apparatus according to claim 5, wherein in the optical axis direction, the substrate and the substrate holder are disposed on a first side with respect to the frame, and the guiding member is disposed on a second side opposite from the first side with respect to the frame, and wherein the shielding member is disposed between the frame and the substrate on the first side with respect to the frame in the optical axis direction.

7. The image forming apparatus according to claim 1, wherein in a case in which the urging member is a first urging member, the image forming apparatus further comprises a second urging member configured to urge the shielding member toward the fourth position, and wherein the detecting unit includes a restricting portion configured to restrict a movement of the shielding member from the third position toward the fourth position in a case in which the detecting unit is positioned in the first position, and the restricting portion allows the movement of the shielding member from the third position toward the fourth position in a case in which the detecting unit is moved from the first position to the second position.

8. The image forming apparatus according to claim 7, wherein a movement direction of the detecting unit relative to the frame and a movement direction of the shielding member relative to the frame are different from each other, and wherein the restricting portion is disengaged from the shielding member by relative movement between the detecting unit and the shielding member when the detecting unit is moved from the first position to the second position.

9. The image forming apparatus according to claim 7, wherein in a case in which the pressed portion is a first pressed portion, the shielding member includes a second pressed portion, and wherein the shielding member is moved from the fourth position to the third position against an urging force of the second urging member by pressing of the second pressed portion by the detecting unit when the detecting unit is moved from the second position to the first position by the urging force of the urging member.

10. The image forming apparatus according to claim 1, wherein in a case in which the urging member is a first urging member, the image forming apparatus further comprises a second urging member configured to urge the shielding member toward the third position, wherein in a case in which the pressed portion is a first pressed portion, the shielding member includes a second pressed portion, and wherein in a case in which the detecting unit is pressed at the first pressed portion, the shielding member is moved from the third position to the fourth position against an urging force of the second urging member by the second pressed portion being pressed.

11. The image forming apparatus according to claim 10, wherein the shielding member is supported by the detecting unit, and the second pressed portion of the shielding member is movable relative to the detecting unit in a direction in which the second pressed portion of the shielding member is projected toward and retracted from the first pressed portion.

12. An image forming apparatus comprising:

an apparatus main body; and a cartridge mountable to and demountable from the apparatus main body and provided with an accommodating portion configured to accommodate a developer, wherein the apparatus main body includes:

a frame provided with an opening;

an urging member;

a detecting unit (i) which includes a light emitting portion configured to emit light, a light receiving portion configured to receive the light emitted by the light emitting portion, and a pressed portion and (ii) which is configured to output a detection signal depending on a light receiving amount of the light received by the light receiving portion, wherein the detecting unit is provided movably relative to the frame between a first position and a second position, and is positioned in the first position by an urging force of the urging member, and wherein the detecting unit is moved from the first position to the second position against the urging force of the urging member by the pressed portion being pressed; and a shielding member provided movably relative to both the frame and the detecting unit between a third position and a fourth position, wherein in either of a state in which the cartridge is not mounted to the apparatus main body or a state in which the cartridge is mounted to the apparatus main body, the detecting unit is positioned in the first position and the shielding member is positioned in the third position, wherein when the detecting unit is positioned in the first position and the shielding member is positioned in the third position, in a case in which the detecting unit is viewed in an optical axis direction of the light emitting portion, at least one of at least a part of the light emitting portion and at least a part of the light receiving portion is positioned inside the opening and is shielded by the shielding member, wherein when the detecting unit is positioned in the second position and the shielding member is positioned in the fourth position, in a case in which the detecting unit is viewed in the optical axis direction, the light emitting portion and the light receiving portion are positioned inside the opening and are not shielded by the shielding member, and wherein the apparatus main body further includes a controller capable of acquiring an amount of the developer in the accommodating portion without using the detecting unit.

13. The image forming apparatus according to claim 12, wherein the controller acquires the amount of the developer accommodated in the cartridge on the basis of information on the amount of the developer accommodated in the cartridge in an unused state, a developer consumption amount per pixel, and an integrated value of a number of pixels forming an image.

* * * * *